US006997447B2

(12) United States Patent
Fukui

(10) Patent No.: US 6,997,447 B2
(45) Date of Patent: Feb. 14, 2006

(54) CLAMP APPARATUS

(75) Inventor: Chiaki Fukui, Abiko (JP)

(73) Assignee: SMC Kabushiki Kaisha, Tokyo (JP)

( * ) Notice: Subject to any disclaimer, the term of this patent is extended or adjusted under 35 U.S.C. 154(b) by 164 days.

(21) Appl. No.: 10/642,633

(22) Filed: Aug. 19, 2003

(65) Prior Publication Data

US 2004/0041324 A1 Mar. 4, 2004

(30) Foreign Application Priority Data

Aug. 30, 2002 (JP) ............................ 2002-254910

(51) Int. Cl.
*B23Q 3/08* (2006.01)

(52) U.S. Cl. ........................................................ 269/32

(58) Field of Classification Search .................. 269/32, 269/24, 285
See application file for complete search history.

(56) References Cited

U.S. PATENT DOCUMENTS

| | | | | |
|---|---|---|---|---|
| 5,382,171 A * | 1/1995 | Hofmann et al. | ........... | 439/142 |
| 5,575,462 A | 11/1996 | Blatt | ........................... | 269/32 |
| 6,378,856 B1 | 4/2002 | Takahashi | .................... | 269/32 |
| 6,739,587 B1 * | 5/2004 | Migliori | ...................... | 269/32 |

* cited by examiner

*Primary Examiner*—Jacob K. Ackun, Jr.
(74) *Attorney, Agent, or Firm*—Paul A. Guss

(57) ABSTRACT

A clamp apparatus converts the rectilinear motion of a cylinder into the rotary motion by means of a toggle mechanism to clamp a workpiece by using an arm. A release projection is covered with a top cover made of metal, preferably with a top cover coated with a material excellent in smoothness. When the arm is going to be unlocked by using the release projection, a tongue of the top cover is lifted upwardly to open the top cover, and the release projection is pushed and moved downwardly.

29 Claims, 20 Drawing Sheets

CLAMP APPARATUS

BACKGROUND OF THE INVENTION

1. Field of the Invention

The present invention relates to a clamp apparatus which converts the rectilinear motion of a cylinder into the rotary motion by means of a toggle mechanism to clamp a workpiece with an arm. In particular, the present invention relates to a clamp apparatus which is provided with a release means for releasing the arm from clamped state to unclamped state wherein the release means is protected by an openable/closable cover member.

2. Description of the Related Art

In general, a release means of a closed type power clamp apparatus has a projection for releasing a toggle section from a housing, and the projection protrudes from the housing, as disclosed in U.S. Pat. No. 5,575,462. When such a power clamp apparatus is used in arc welding, the projection is covered with a cover so that no spatter is adhered to the projection. When the toggle section is released, the cover should be detached to make the toggle section unclamped, and then the cover should be attached again. That is, the operation to detach the cover and attach the cover is required for releasing the toggle section. Therefore, the operation process is complicated, and a considerably long period of time is required. As a whole, the production efficiency is not improved so much.

SUMMARY OF THE INVENTION

A principal object of the present invention is to provide a clamp apparatus in which a cover member is installed openably/closably to a main body of the clamp apparatus to avoid adhesion of spatters in a welding environment in order to dispense with the operation to detach and reattach the cover of the clamp apparatus as described above.

Another object of the present invention is to provide a clamp apparatus which converts the rectilinear motion of a cylinder into the rotary motion by means of a toggle mechanism to clamp a workpiece with an arm wherein a cover member is provided openably/closably on a main cylinder body so that a release means for unclamping the arm is covered therewith.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The clamp apparatus according to the present invention will be explained in detail below as exemplified by preferred embodiments.

Figure 1:
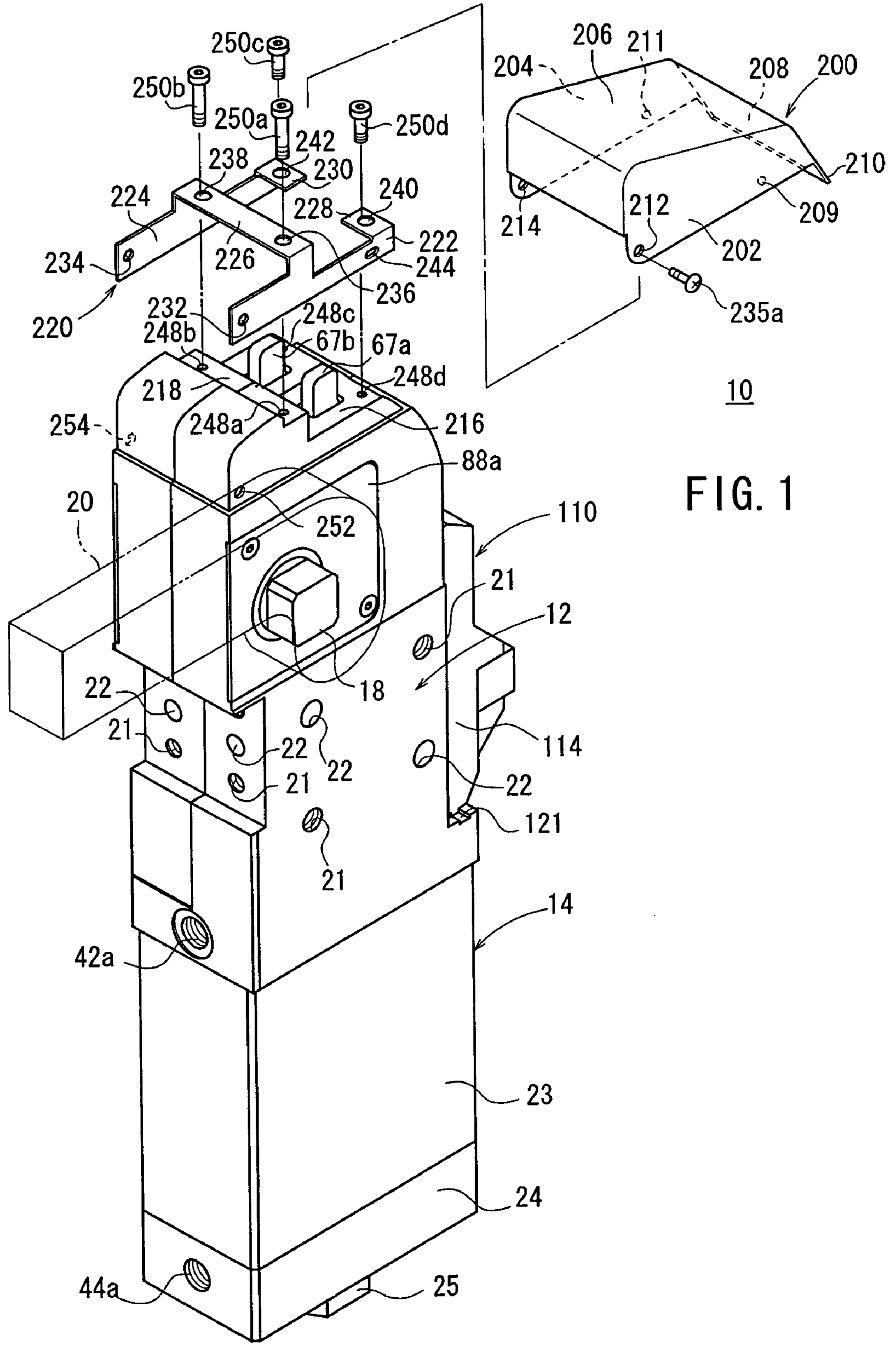
FIG. 1 is an exploded perspective view illustrating a clamp apparatus according to an embodiment of the present invention.

With reference to FIG. 1, reference numeral 10 indicates a closed type power clamp apparatus according to an embodiment of the present invention. The clamp apparatus 10 comprises a body 12 which is flat, a cylinder section 14 which is connected air-tightly to the lower end of the body 12, and an arm 20 which is connected to one of rectangular bearing sections 18 that protrude through a pair of substantially circular openings 16*a*, 16*b* (see FIG. 4) formed in the body 12.

On the side of the body 12, there are a plurality of attachment screw holes 21 for attaching the clamp apparatus 10 to another member by screwing unillustrated attachment screws thereinto, and a plurality of positioning holes 22 for positioning by inserting unillustrated pins when the clamp apparatus 10 is attached.

Figure 2:
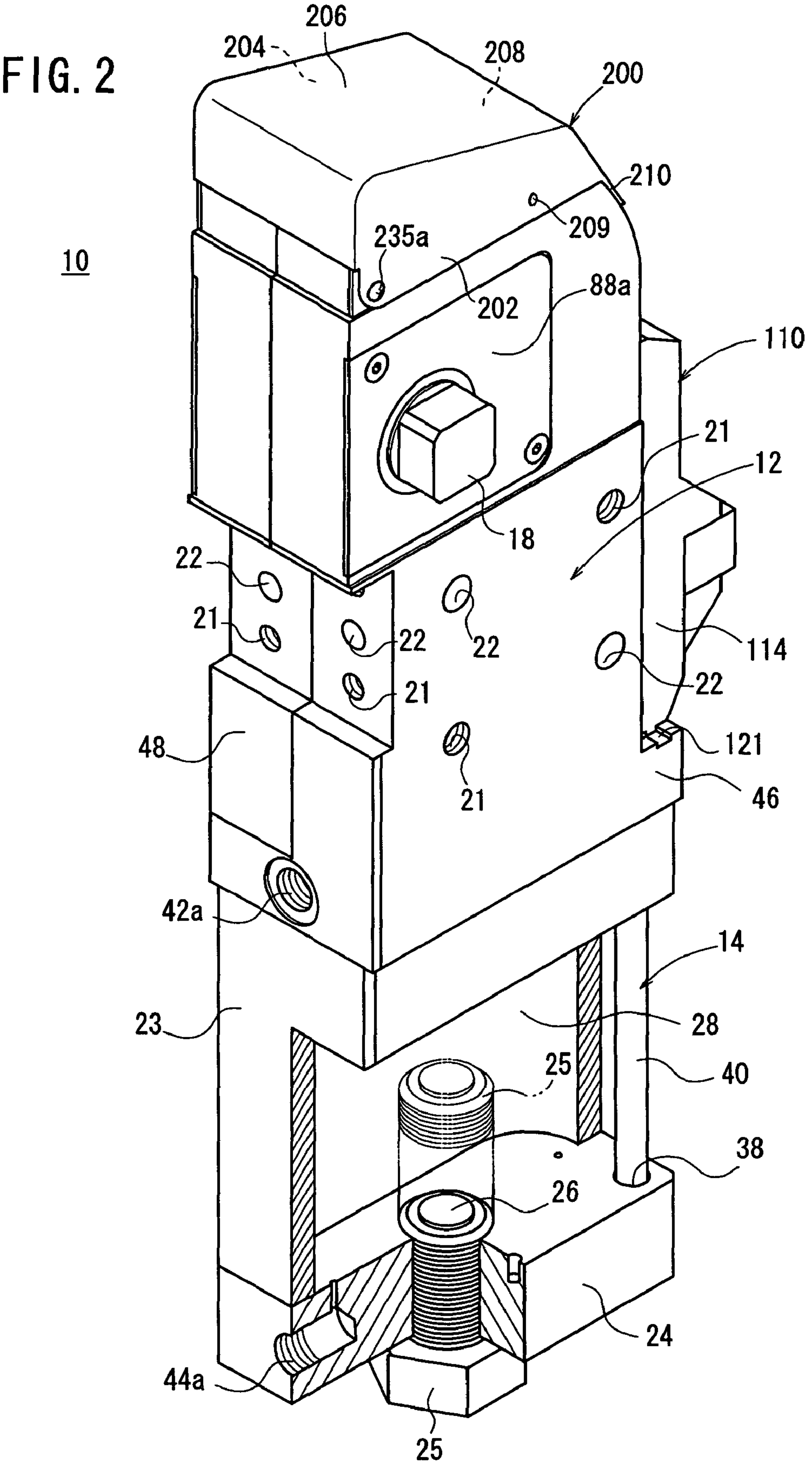
FIG. 2 is, with partial cutaway, a perspective view illustrating a cylinder section of the clamp apparatus shown in FIG. 1.

As shown in FIG. 2, the cylinder section 14 includes a cylinder tube 23 which has a cylinder chamber 28 formed therein having an oblong circular cross section, and an end block 24 which is connected to one end of the cylinder tube 23 by an unillustrated seal member to close the cylinder chamber 28. A stopper bolt 25 is screwed into a screw hole penetrating through a substantially central portion of the end block 24. A damper member 26 formed of a rubber material such as urethane rubber is installed to one end of the stopper bolt 25 which faces the cylinder chamber 28.

A variety of stopper bolts 25 having different lengths corresponding to the amounts of rotation of the arm 20 (see two-dot chain lines in FIG. 2) may be used as described later on. When the stopper bolt 25 is replaced with another stopper bolt 25 having a different length, the initial position (lower limit position) of a piston 30 can be set to an arbitrary position. A seal member 27 is interposed between the head of the stopper bolt 25 and the end block 24 for closing the screw hole.

Figure 3:
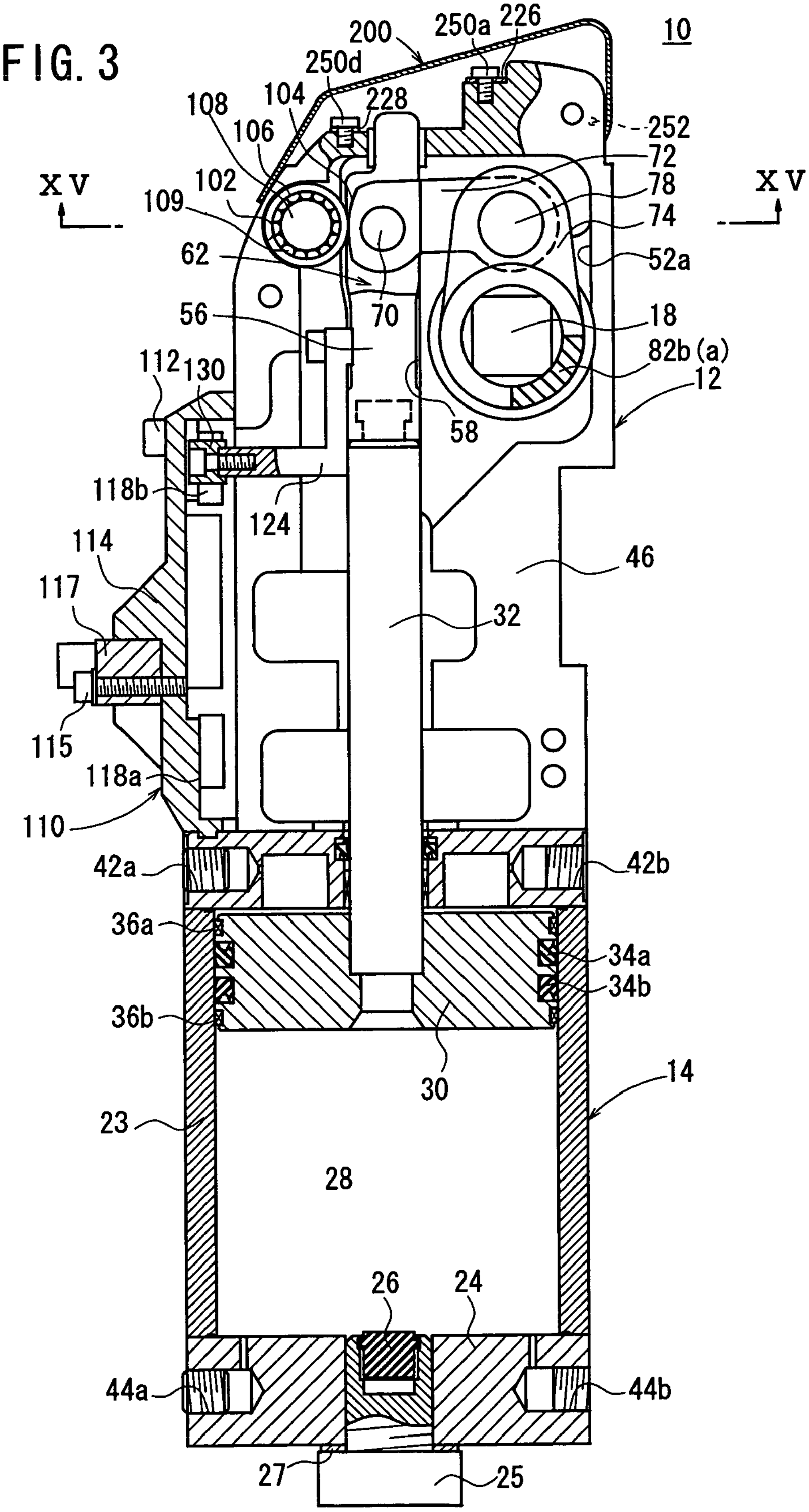
FIG. 3 is a partial vertical sectional view taken in the axial direction of the clamp apparatus shown in FIG. 1.

As shown in FIG. 3, the cylinder section 14 further includes the piston 30 which has a shape corresponding to the cross-sectional shape of the cylinder chamber 28 and reciprocates along the cylinder chamber 28, and a piston rod 32 which is connected to a central portion of the piston 30 and is displaceable together with the piston 30. In this arrangement, when the piston 30 is moved downwardly to contact the damper member 26 of the stopper bolt 25, the end position the displacement (lower limit position) of the piston 30 is restricted, and the shock generated upon the contact is absorbed by the damper member 26.

As shown in FIG. 3, pairs of piston packings 34*a*, 34*b* and seal rings 36*a*, 36*b* are installed to the outer circumferential surface of the piston 30. Attachment holes 38 penetrate through four corners of the end block 24 and the cylinder tube 23. The end block 24 and the cylinder tube 23 are assembled to the body 12 air-tightly (see FIG. 2) by four shafts 40 which are inserted through the attachment holes 38. Pairs of pressure fluid inlet/outlet ports 42*a*, 42*b*, and 44*a*, 44*b*, are formed in the body 12 and the end block 24, respectively for supplying/discharging the pressure fluid (for example, compressed air) into/from the cylinder chamber 28. The pairs of pressure fluid inlet/outlet ports 42*a*, 42*b*, and 44*a*, 44*b* are opposed to one another (see FIG. 3).

When the clamp apparatus 10 is actually used, unillustrated blank caps are screwed into the pressure fluid inlet/outlet ports 42*a*, 44*a* (or 42*b*, 44*b*). Accordingly, the clamp apparatus 10 is used in a state in which the pressure fluid inlet/outlet ports 42*a*, 44*a* (or 42*b*, 44*b*) are closed.

Figure 4:
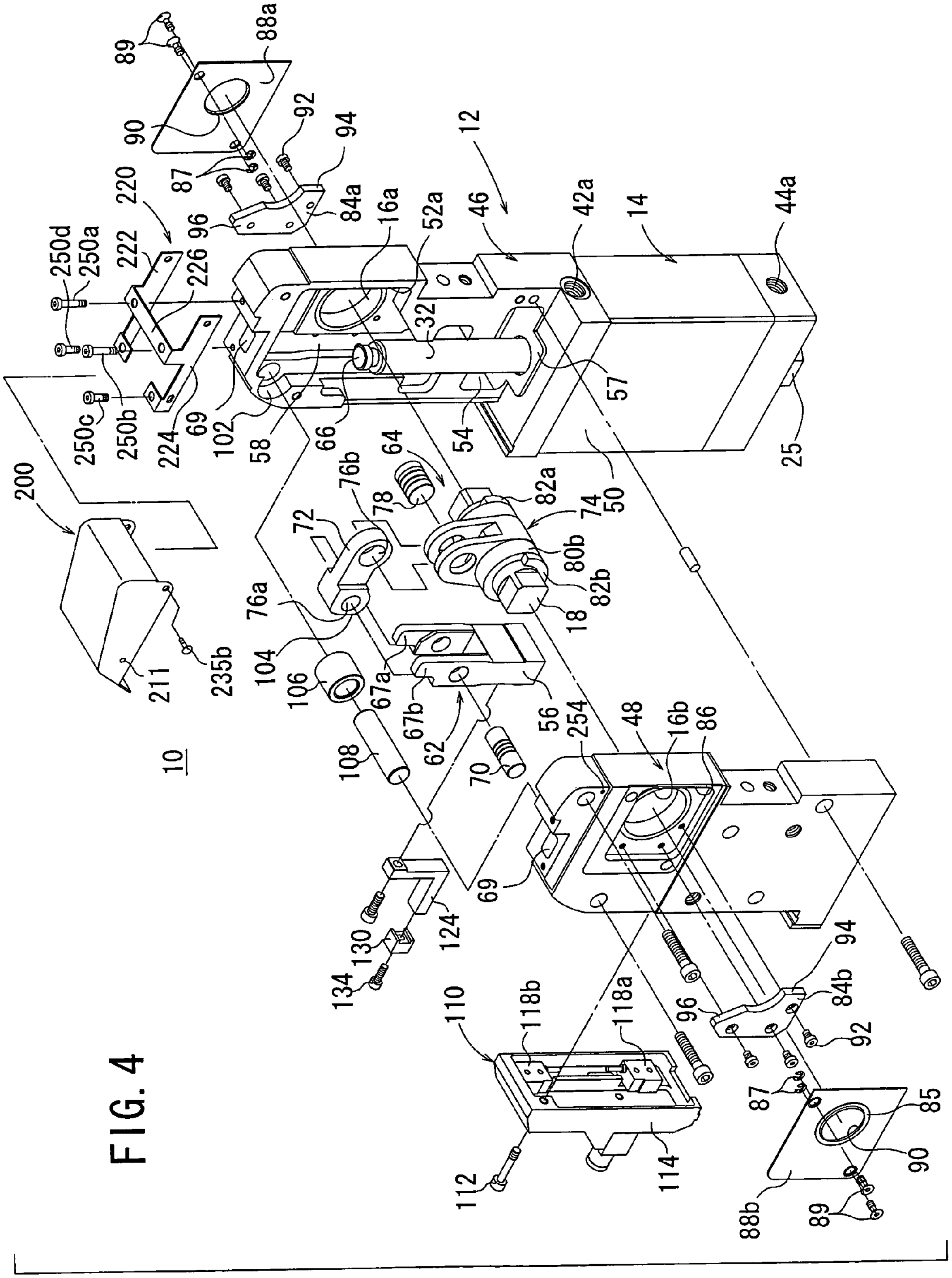
FIG. 4 is an exploded perspective view illustrating a body of the clamp apparatus shown in FIG. 1.

As shown in FIG. 4, the body 12 comprises a first casing 46 and a second casing 48 which are asymmetric to one another and which are assembled into one unit. A projection (or box) 50 is formed integrally at the lower end of the first casing 46, and protrudes in a substantially horizontal direction as a rod cover. The second casing 48 is short in the longitudinal direction compared with the first casing 46, by the length of the projection 50. In this arrangement, as shown in FIG. 4, the second casing 48 can be detached from the first casing 46 without disassembling the cylinder section 14. Accordingly, it is possible to easily disassemble the body 12.

As shown in FIG. 4, a chamber 54 is formed in the body 12 by recesses 52*a*, 52*b* (recess 52*b* is not shown because it is the same as the recess 52*a*) which are formed on the first casing 46 and the second casing 48, respectively. The piston rod 32 protrudes from the cylinder section 14, and has a free end in the chamber 54.

A pair of opposing guide grooves 58 are formed on the inner wall surfaces of the first casing 46 and the second casing 48. The guide grooves 58 are rectangular grooves extending in the axial direction. A knuckle block 56 is connected to the free end of the piston rod 32 as described later on, and slides along the guide grooves 58. Accordingly, the knuckle block 56 is guided for linear sliding movement in the vertical direction. As shown in FIG. 4, a step 57 is formed on the upper surface of the projection 50 and surrounds the outer circumferential surface of the piston rod 32.

Figure 5:
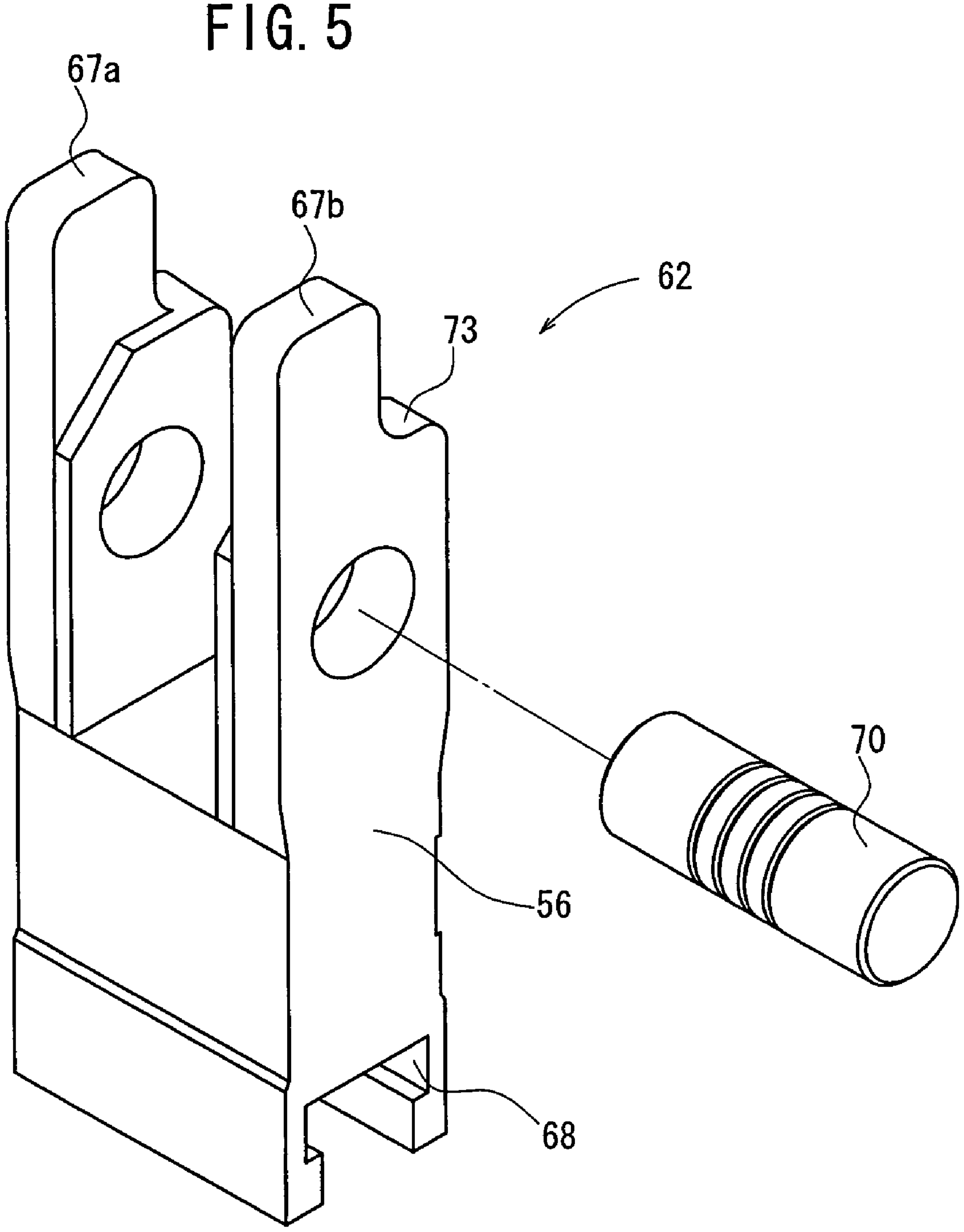
FIG. 5 is a magnified exploded perspective view illustrating a knuckle joint of the clamp apparatus shown in FIG. 1.

As shown in FIG. 4, a toggle link mechanism 64 is provided at one end of the piston rod 32, and converts the rectilinear motion of the piston rod 32 into the rotary motion of the arm 20 by the aid of a knuckle joint 62. As shown in FIG. 5, the knuckle joint 62 includes the knuckle block 56 which has a bifurcated section having branches spaced from each other by a predetermined distance to extend substantially in parallel to one another, and a knuckle pin 70 which is rotatably attached to holes formed through the two branches of the bifurcated section.

A pair of release projections 67*a*, 67*b* protrude upwardly and integrally on the two branches of the knuckle block 56. When a workpiece is clamped by the arm 20 (see FIG. 1), the release projections 67*a*, 67*b* protrude by a predetermined length from substantially rectangular openings 69 formed in the upper surfaces of the first and second casings 46, 48.

A top cover 200 formed of a metal member is installed to the top of the body 12 which is constructed by the first and second casings 46, 48. The entire top portion including the release projections 67*a*, 67*b* protruding from the openings 69 is covered with the top cover 200. The structure and other features of the top cover 200 will be described later on.

Figure 14:
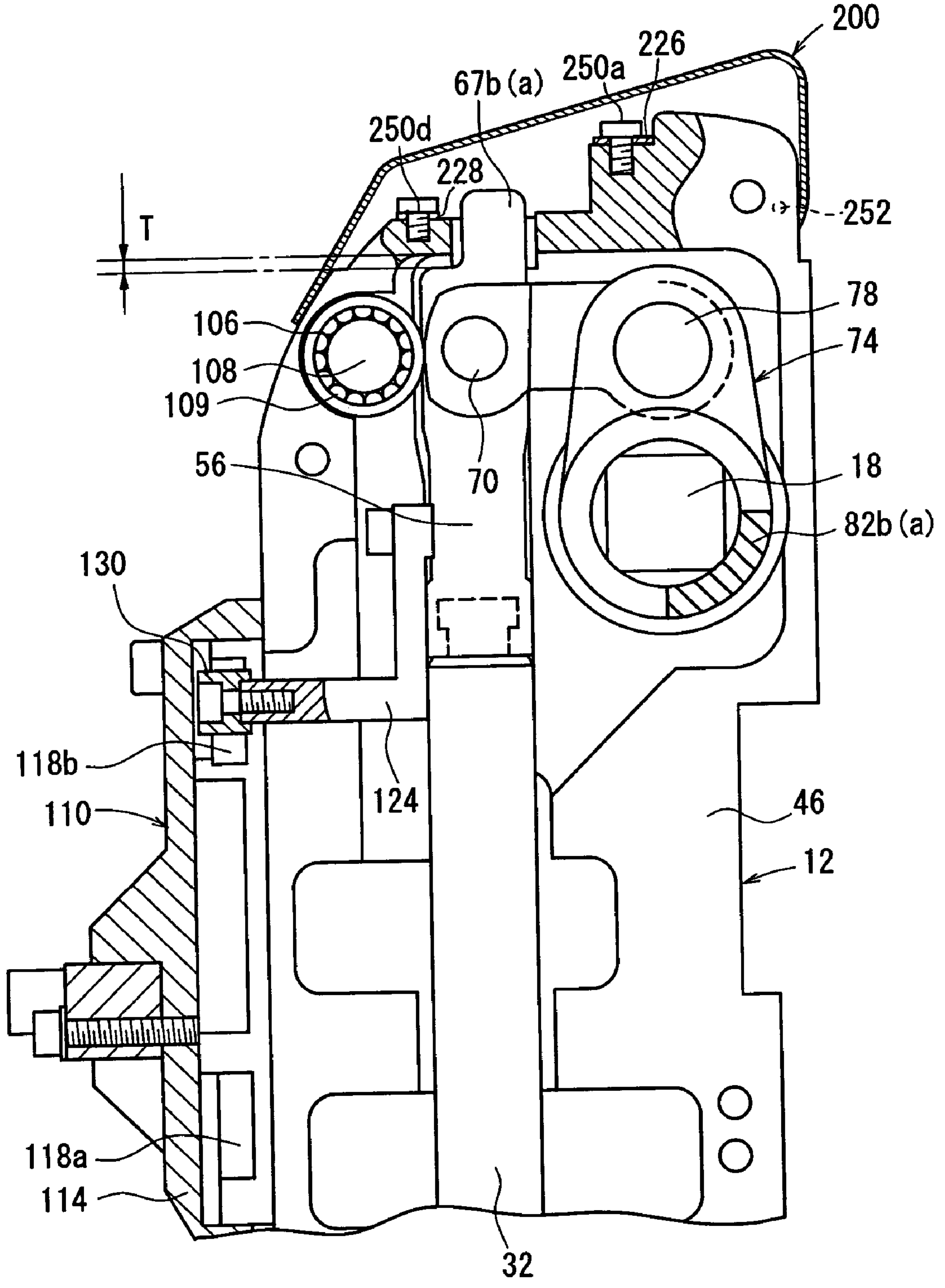
FIG. 14 shows, with partial cutaway in vertical cross section, that a piston is further moved upwardly from the clamped state shown in FIG. 13 to an end position of the displacement.

Steps 73 (see FIG. 5) of the two branches of the knuckle block 56 formed closely to the release projections 67*a*, 67*b* do not contact the upper inner wall surface of the body 12 when the workpiece is clamped as shown in FIG. 14. At that time, a predetermined clearance T is provided between the steps 73 and the upper inner wall surface of the body 12.

As shown in FIG. 5, a groove 68 having a T-shaped cross section extends in a bottom surface of the knuckle block 56 by a predetermined length in a substantially horizontal direction. The groove 68 is engageable with a disk-shaped projection 66 of the piston rod 32. In this arrangement, predetermined clearances are formed between the groove 68 and the projection 66 formed integrally with the piston rod 32 and between the knuckle block 56 and the guide grooves 58. The knuckle block 56 is displaceable by a minute distance in a substantially horizontal direction in the groove 68. Accordingly, the piston rod 32 is prevented from any transmission of the load in the lateral direction.

In other words, since the knuckle block 56 is displaceable, no lateral load is applied, for example, to the piston rod 32 and the piston 30 when the workpiece is clamped. It is possible to efficiently transmit the stroke of the piston rod 32 to the toggle link mechanism 64.

As shown in FIG. 4, the toggle link mechanism 64 includes a link plate 72 which is connected between the two branches of the knuckle joint 62 by the knuckle pin 70, and a support lever 74 which is rotatably supported in the pair of substantially circular openings 16*a*, 16*b* formed through the first casing 46 and the second casing 48 respectively.

The link plate 72 is interposed between the knuckle joint 62 and the support lever 74. The link plate 72 functions to link the knuckle joint 62 and the support lever 74. That is, a pair of holes 76*a*, 76*b* are formed through the link plate 72, and are spaced from each other by a predetermined distance. The link plate 72 is connected to the free end of the piston rod 32 through the knuckle joint 62 by using the knuckle pin 70 rotatably attached in the hole 76*a*. The link plate 72 is also connected to the two branches of the support lever 74 by using a link pin 78 rotatably attached in the other hole 76*b*.

Figure 6:
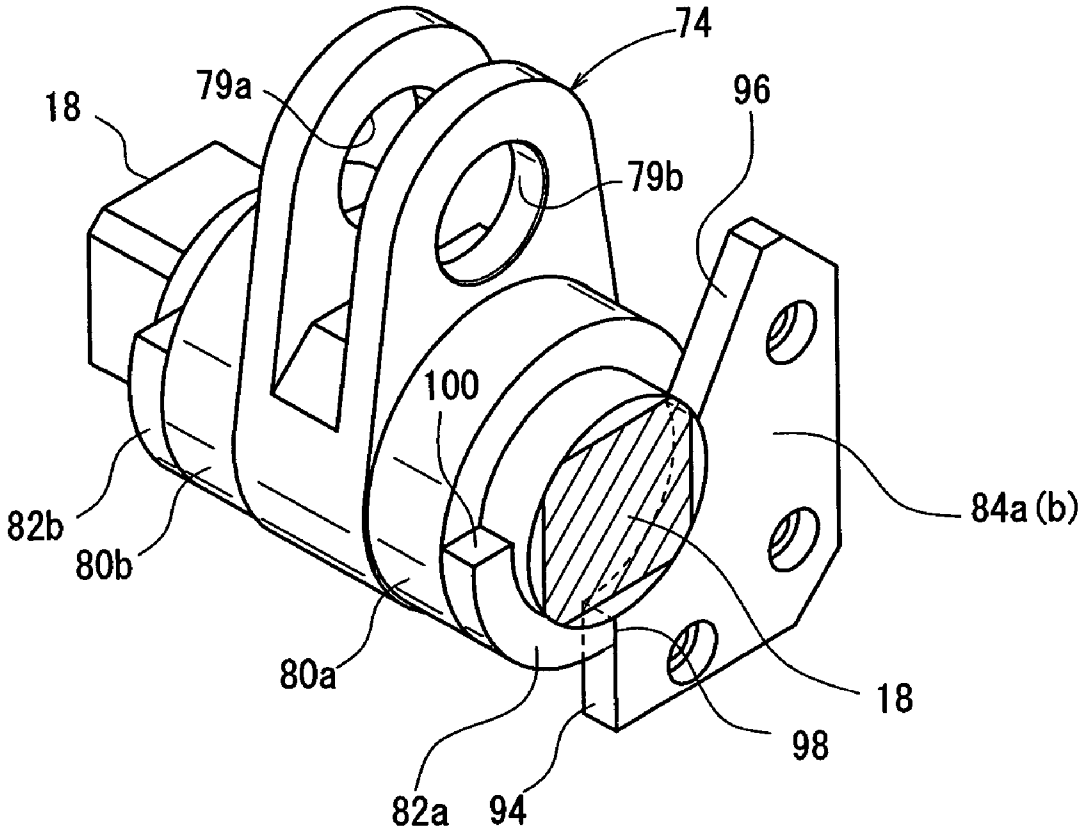
FIG. 6 is, with partial cutaway, a magnified perspective view illustrating how a circular arc-shaped projection of a support lever contacts a plate.

As shown in FIG. 6, the support lever 74 includes a bifurcated section which has two branches formed with holes 79*a*, 79*b* for rotatably attaching the link pin 78 thereto, the partially rectangular bearing sections 18 which protrude in a direction substantially perpendicular to the axis of the piston rod 32 and which are exposed from the body 12 through the openings 16*a*, 16*b*, a pair of circumferential sections 80*a*, 80*b* which are formed on both ends of the two branches with the two branches interposed between circumferential sections 80*a*, 80*b* and which are fitted to the substantially circular openings. 16*a*, 16*b* of the body 12 respectively, and a pair of circular arc-shaped projections 82*a*, 82*b* which protrude slightly in the lateral direction from the circumferential sections 80*a*, 80*b* and which are exposed from the body 12 through the openings 16*a*, 16*b*. The arm 20 is detachably installed to the bearing section 18 for clamping the unillustrated workpiece.

The support lever 74 rotates together with the arm 20. The circular arc-shaped projections 82*a*, 82*b* on the support lever 74 function as stoppers for stopping the rotation of the arm 20 by contacting a pair of plates 84*a*, 84*b* fixed to the body 12 (as described later on).

The rectilinear motion of the piston rod 32 is transmitted to the support lever 74 via the knuckle joint 62 and the link plate 72. The support lever 74 is rotatable by a predetermined angle about the center of rotation of the circumferential sections 80*a*, 80*b* supported in the pair of openings 16*a*, 16*b* formed through the body 12.

Figure 7:
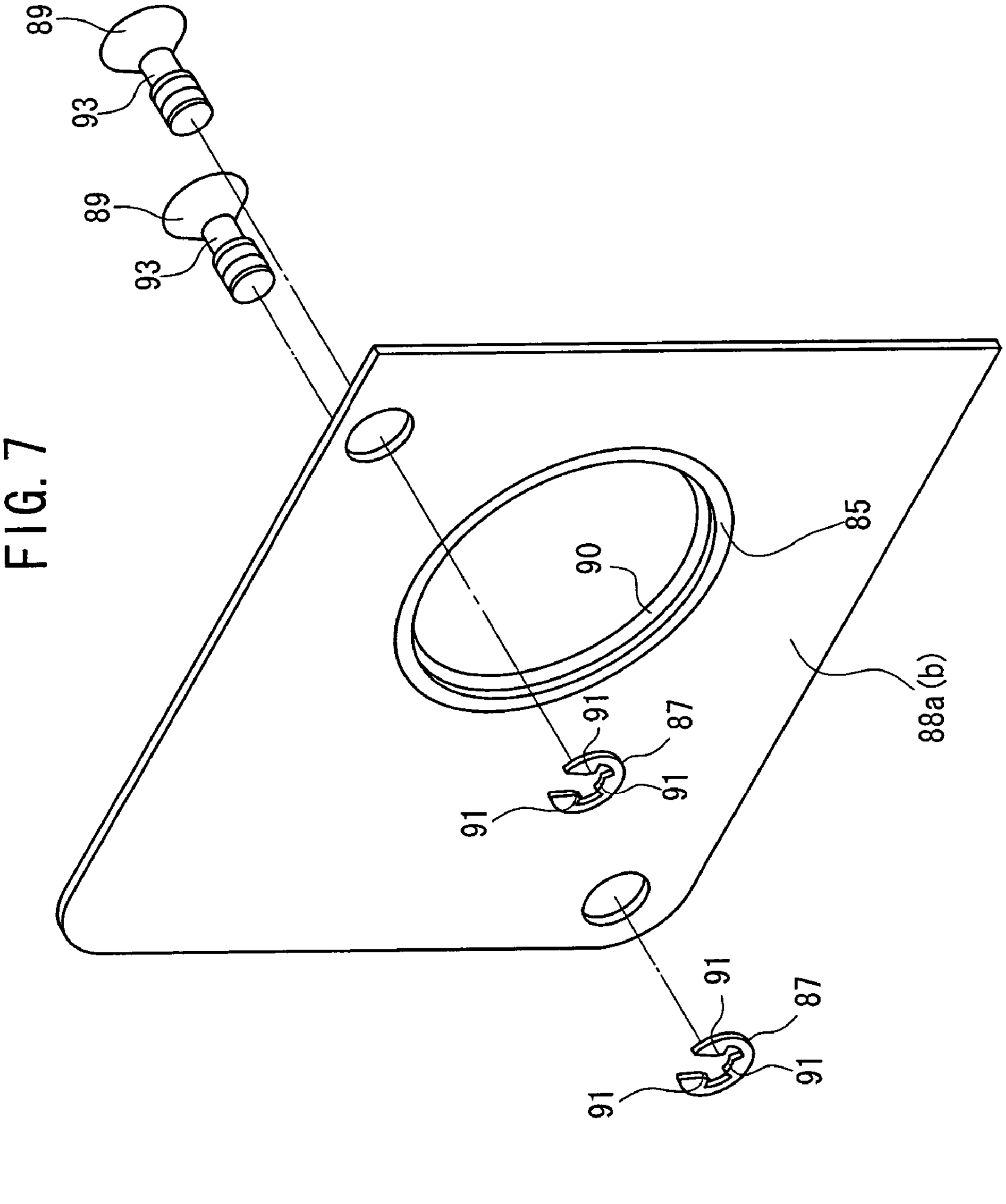
FIG. 7 is a magnified exploded perspective view illustrating a snap ring and a screw member for fastening a cover member.

As shown in FIG. 4, rectangular recesses 86 are formed on the sides of the first casing 46 and the second casing 48 of the body 12. The recesses 86 are closed by a pair of cover members 88*a*, 88*b*. The substantially circular openings 16*a*, 16*b* are formed with seal members 85 as the lining of an elastic member such as rubber, at substantially central portions of the cover members 88*a*, 88*b*. The circumferential sections 80*a*, 80*b* of the support lever 74 are sealed with the seal members 85. Accordingly, the cover members 88*a*, 88*b* protect the inside of the cover members 88*a*, 88*b* from spatters, water, or the like (see FIG. 7).

The cover members 88*a*, 88*b* are detachably installed by means of screw members 89. Snap rings 87 are provided for the screw members 89 (see FIG. 7) for preventing the screw members 89 from being disengaged from the cover members 88*a*, 88*b* when the screw members 89 are loosened. A plurality of pawls 91 are formed separately along the inner circumferential surface of the snap ring 87, and are engaged with a small diameter section 93 of the screw member 89 to prevent the screw member 89 from disengagement thereby. In this arrangement, the bearing sections 18 of the support lever 74 are exposed through substantially circular openings 90 formed substantially central portions of the cover members 88*a*, 88*b*.

The plates 84*a*, 84*b* are fixed to the wall surfaces of the recesses 86 by screw members 92 for stopping the rotary action of the arm 20 by contacting the circular arc-shaped projections 82*a*, 82*b* of the support lever 74.

As shown in FIG. 6, the plate 84*a* (84*b*) has a first surface 94 which is formed substantially in parallel to the vertical plane, and a second surface 96 which is inclined by a predetermined angle with respect to the vertical plane. The first surface 94 contacts one end surface 98 of the circular arc-shaped projection 82*a* (82*b*) of the support lever 74 when the workpiece is clamped. The second surface 96 of the plate 84*a* (84*b*) does not contact the other end surface 100 of the circular arc-shaped projection 82*a* (82*b*) of the support lever 74 at the initial position at which the arm 20 is in the unclamped state.

In this arrangement, the pair of plates 84*a*, 84*b* can be easily replaced with other plates by detaching the pair of cover members 88*a*, 88*b* from the body 12 and loosening the screw members 92. When the pair of cover members 88*a*, 88*b* are detached from the body 12, one end surface 98 and the other end surface 100 of the circular arc-shaped projection 82*a* (82*b*) formed on the support lever 74 are exposed.

Figure 15:
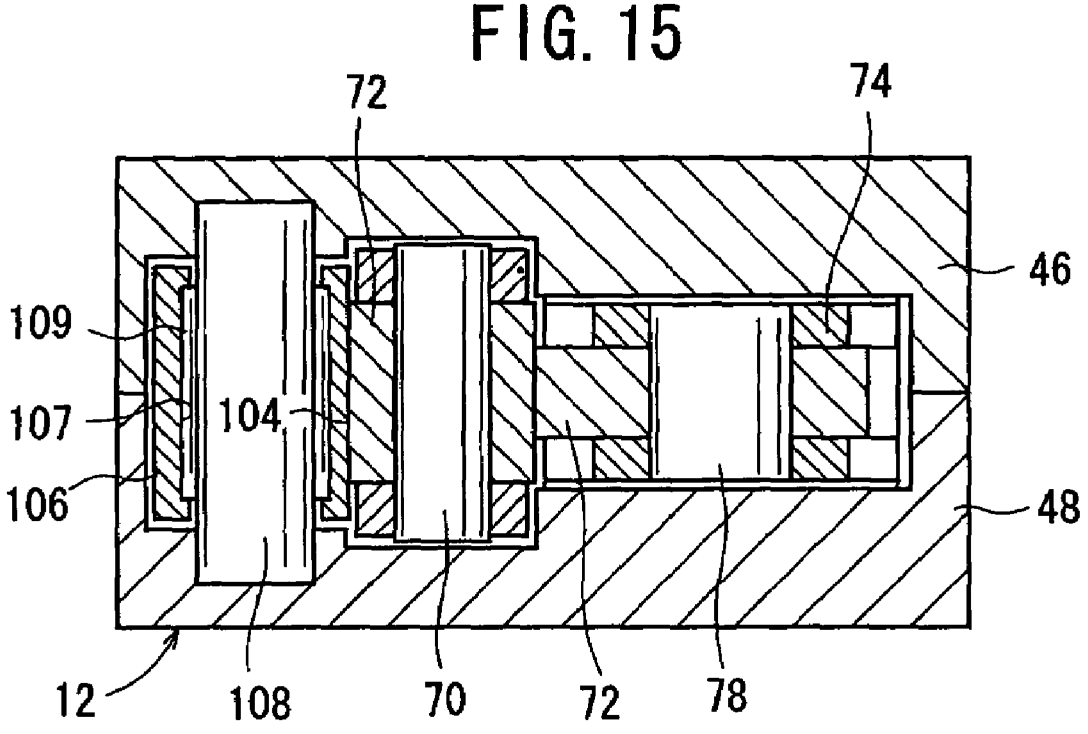
FIG. 15 is a lateral sectional view taken along a line XV—XV shown in FIG. 3.

As shown in FIG. 4, recesses 102 having circular arc-shaped cross sections are formed on upper portions of the inner wall surfaces of the first casing 46 and the second casing 48 of the body 12. A guide roller 106 is provided in the recesses 102, and is rotated by a predetermined angle upon the contact with a curved surface 104 of the link plate 72. A pin member 108 is secured in holes formed in the first casing 46 and the second casing 48 for rotatably supporting the guide roller 106. A plurality of needle bearings 109 are installed in the circumferential direction of an annular recess 107 in the through-hole of the guide roller 106 (see FIG. 15). The guide roller 106 is smoothly rollable under the rolling action of the needle bearings 109.

Figure 8:
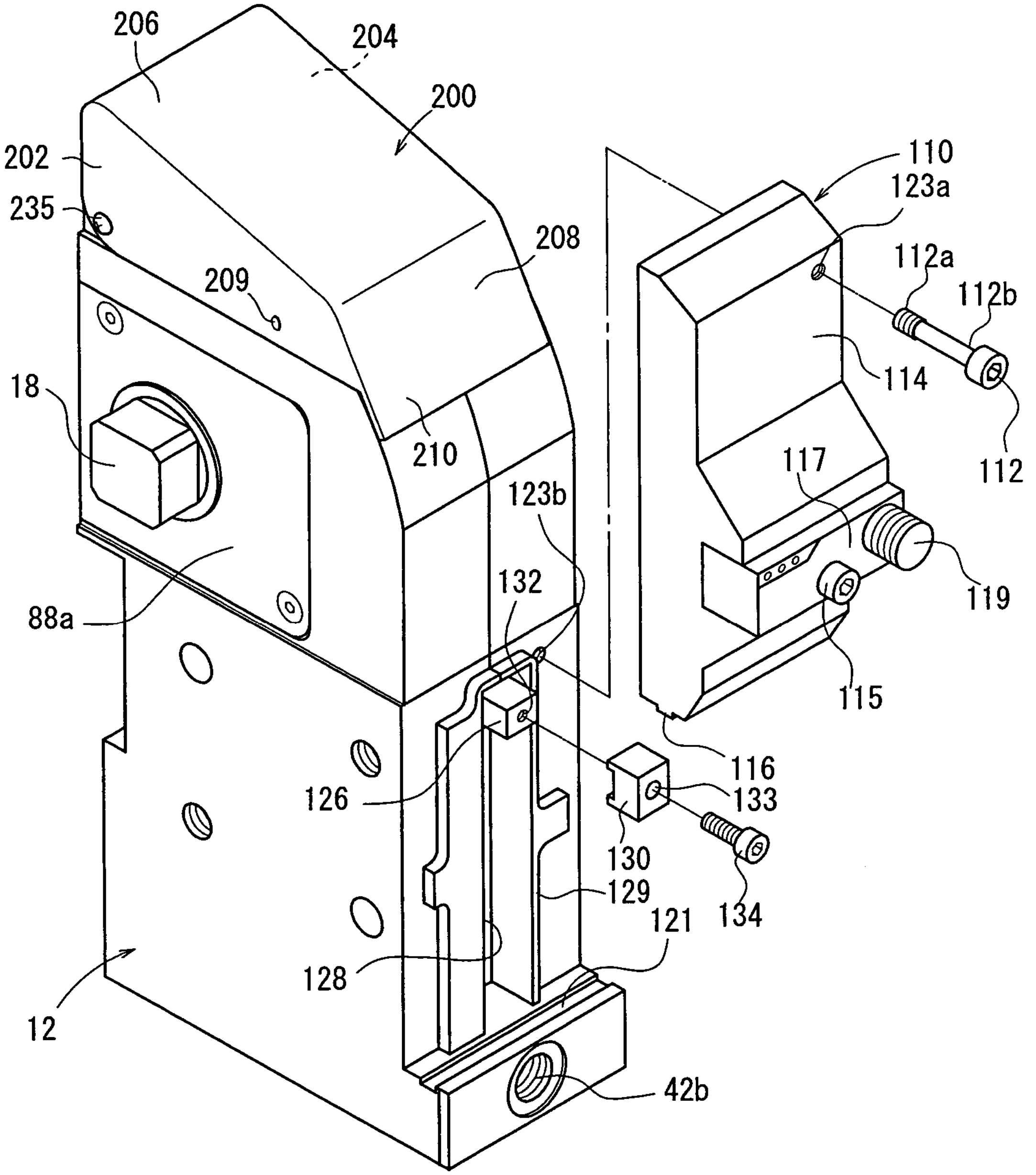
FIG. 8 is an exploded perspective view illustrating a detecting section of the clamp apparatus shown in FIG. 1.

As shown in FIGS. 4 and 8, a detecting section 110 is detachably connected to the outer wall surface of the body 12 by a screw member 112 for detecting the rotation amount of the arm 20 that is rotatable by a predetermined angle. The detecting section 110 includes a switch holder 114 which is installed to the side of the body 12, and a rectangular parallelepiped-shaped connector section 117 which is connected integrally with the switch holder 114 by the an attachment bolt 115. A connector 119 is provided closely to the attachment bolt 115 on the connector section 117.

As shown in FIG. 8, a striped ridge 116 is formed at a lower portion of the switch holder 114, and extends in a substantially horizontal direction. When the striped ridge 116 is inserted into a groove 121 in the body 12, the switch holder 114 is positioned at a predetermined position, and the switch holder 114 is installed to the body 12 and prevented from rotation. In this arrangement, the switch holder 114 is fixed to the body 12 by one screw member 112.

Figure 16:
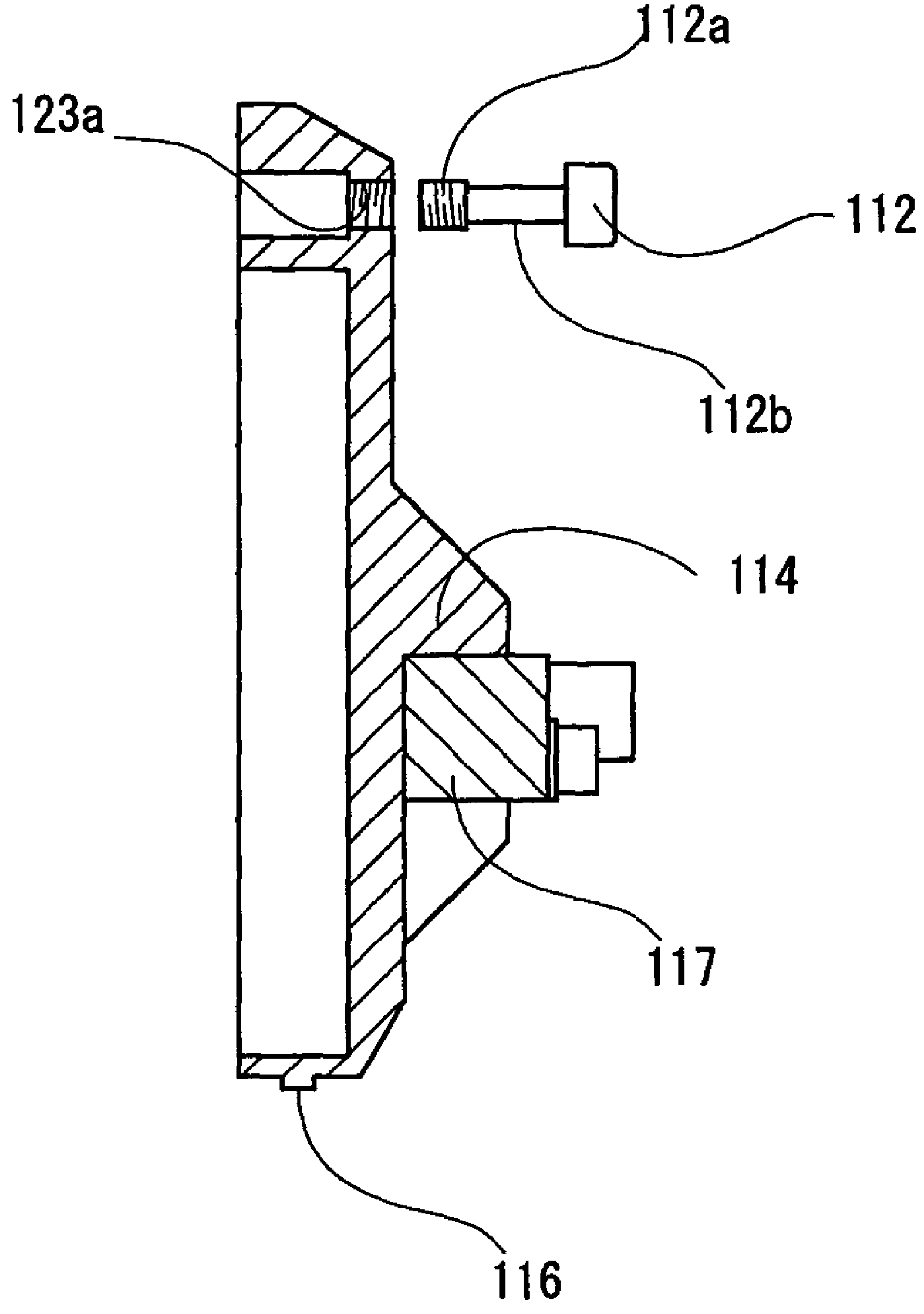
FIG. 16 is a magnified vertical sectional view illustrating a screw member for fastening a switch holder to a side of the body.

As shown in FIGS. 8 and 16, the screw member 112 has a screw section 112*a* on which a plurality of spiral ridges and spiral grooves are formed, and a columnar section 112*b* which has a diameter smaller than a diameter of the spiral grooves. When the screw section 112*a* is screwed into a screw hole 123*a* of the switch holder 114 to fit the screw section 112*a* to a screw hole 123*b* of the body 12, the switch holder 114 is installed to the body 12 by the screw member 112. When the screw member 112 is loosened to detach the switch holder 114 from the body 12, the screw section 112*a* of the screw member 112 is engaged with the screw hole 123*a* of the switch holder 114 to prevent disengagement. Accordingly, it is possible to avoid the disengagement of the screw member 112 from the switch holder 114.

Figure 9:
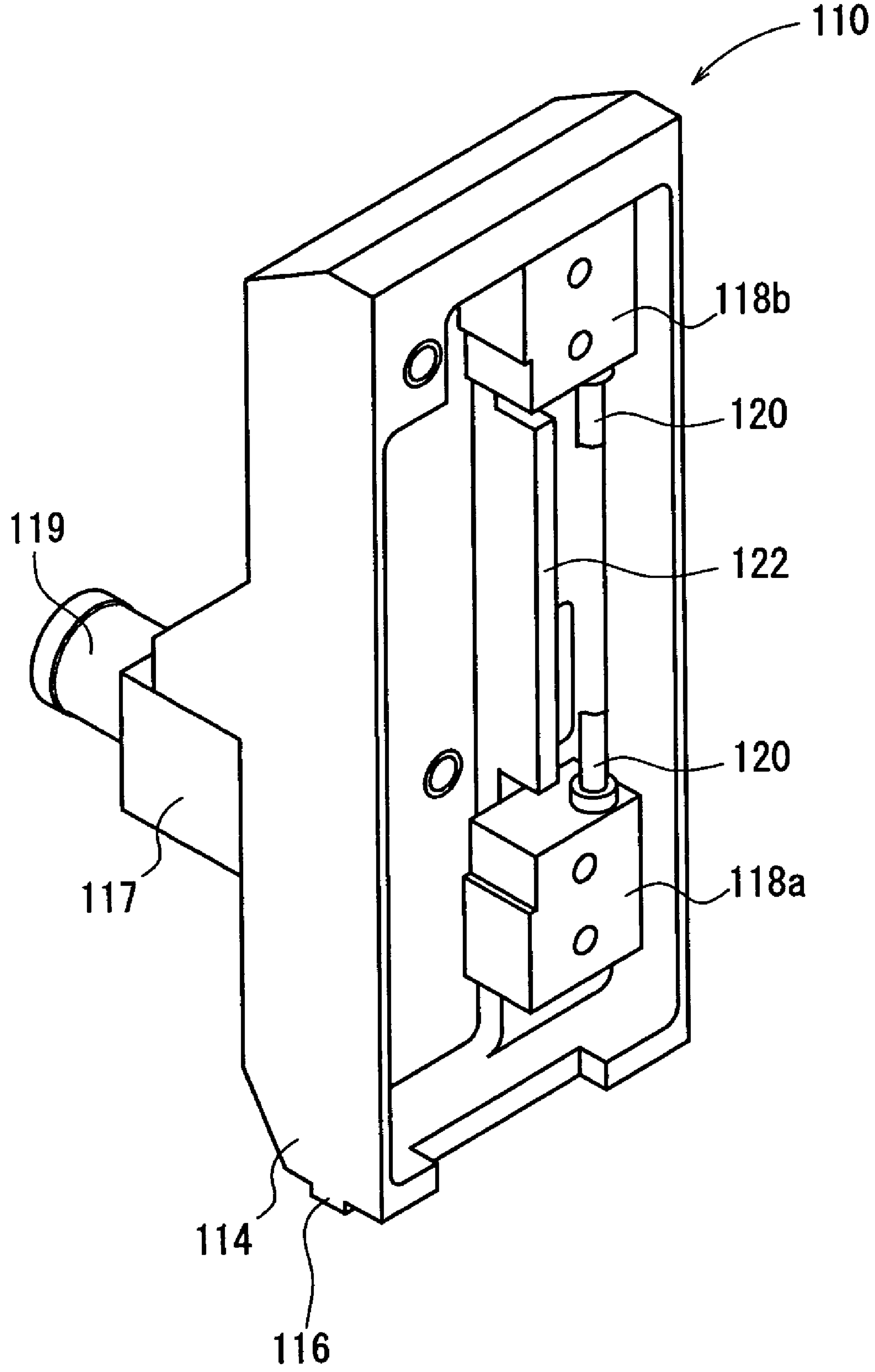
FIG. 9 is a magnified perspective view illustrating a switch holder of the detecting section shown in FIG. 8 as viewed from the bottom.

As shown in FIG. 9, a pair of proximity switches 118*a*, 118*b* are secured in a recess formed on the inner wall surface of the switch holder 114, and spaced from each other by a predetermined distance. The proximity switches 118*a*, 118*b* sense the position of a metal object by utilizing the change in impedance when the metal object approaches. The proximity switches 118*a*, 118*b* are connected to the connector section 117 via lead wires 120. Therefore, the detection signal outputted from the proximity switches 118*a*, 118*b*, is sent, for example, via an unillustrated coaxial cable to an unillustrated external apparatus (for example, a controller) connected to the connecting connector 119 to perform desired control. A plate-shaped partition wall 122 is formed between the pair of proximity switches 118*a*, 118*b* in order to accommodate the lead wires 120.

As shown in FIGS. 3 and 4, the detection section 110 has a substantially L-shaped bent member 124 which is made of a metal material. The bent member 124 is fixed to the knuckle block 56 to move together with the knuckle block 56. The bent member 124 has one end 126 exposed by a predetermined length through a long groove 128 formed through the body 12. A step section 129 is formed around the long groove 128 in order to avoid invasion of liquid into the body 12 through the long groove 128.

An attachment screw hole 132 is formed at one end 126 of the bent member 124 which protrudes from the long groove 128 for installing a block-shaped holding member 130. The holding member 130 is detachably installed to the bent member 124 by a screw member 134 screwed into the attachment screw hole 132 through a penetrating screw hole 133. The knuckle block 56, the bent member 124, and the holding member 130 are displaceable linearly and together with the piston rod 32.

Figure 10:
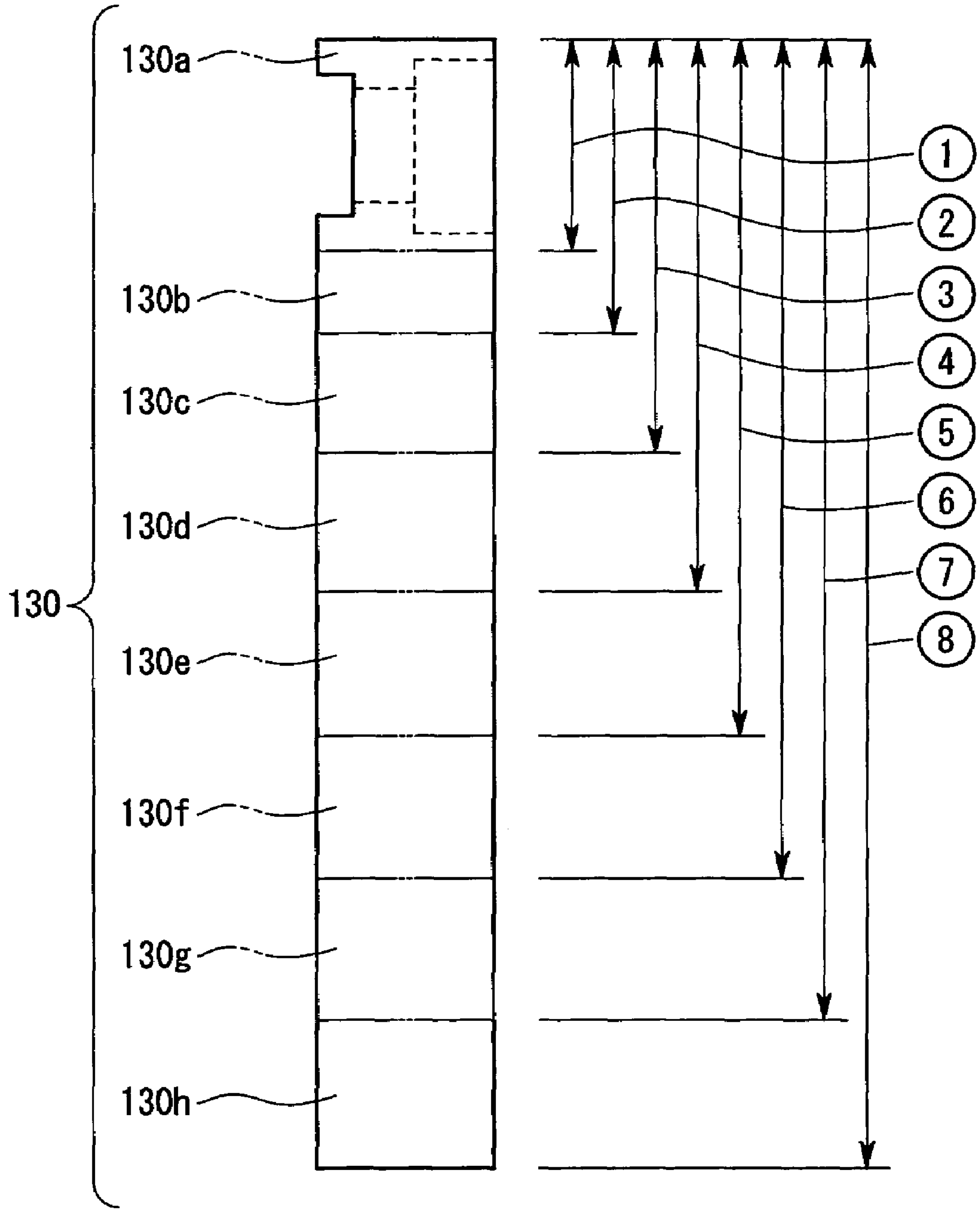
FIG. 10 illustrates a plurality of holding members to be connected to one end of a bent member of the detecting section shown in FIG. 8.

As shown in FIG. 10, the holding member 130 includes a plurality of holding members 130*a* to 130*h* which are made of a metal material and which have different lengths (1) to (8), respectively. One of the holding members 130*a* to 130*h* is selectively provided corresponding to the amount of rotation of the arm 20. The holding member 130 can be easily replaced with other holding members 130*a* to 130*h* by detaching the switch holder 114 from the body 12 and loosening the screw member 112.

That is, the rotation amount of the arm 20 is set by the stopper bolt 25 which determines the lower limit position of the piston 30. A desired rotation amount of the arm 20 can be established by exchanging the stopper bolt 25 with one of other stopper bolts 25 which have different lengths in the axial direction.

For example, when the stopper bolt 25 shown in FIG. 3 is used, the rotation amount of the arm 20 is maximum. The holding member 130*a*, which has the shortest length (1), is attached to the end 126 of the bent member 124 fixed to the knuckle block 56. The holding member 130*a* is displaced linearly along the long groove 128 from the initial position in the unclamped state to the end position of displacement in the clamped state (see FIG. 8). In this case, the holding member 130*a*, which is the metal detection object, is sensed by the pair of proximity switches 118*a*, 118*b* upon the arrival at the initial position and the end position of displacement.

On the other hand, when unillustrated another stopper bolt 25, which has a large length in the axial direction is used, the rotation amount of the arm 20 is minimum. When the initial position is detected by the proximity switch 118*a*, the end 126 of the bent member 124 at the initial position is spaced from the proximity switch 118*a*. Therefore, the holding member 130*h* of the metal detection object is connected to the end 126 of the bent member 124 to sense the holding member 130*h* with the proximity switch 118*a*. In other words, when the unillustrated another stopper bolt 25 is used, the holding member 130*h*, which has the length (8) corresponding to the distance of separation between the end 126 of the bent member 124 and the proximity switch 118*a*, is connected to the end 126. Accordingly, the position can be detected by using the proximity switch 118*a*.

Similarly, other holding members 130*b* to 130*g*, which have the different lengths (2) to (7), respectively, are connected corresponding to unillustrated other stopper bolts 25 which have the different lengths.

The initial position of the end 126 of the bent member 124 is changed depending on the stopper bolt 25 for setting the rotation amount of the arm 20, and the displacement amount of the end 126 of the bent member 124 is changed in accordance therewith. However, the end position of displacement at which the clamped state is established is regulated by the plates 84*a*, 84*b* which function as the stoppers. Therefore, the end position of displacement is constant in any case.

As described above, even when the stopper bolt 25 having the desired length is selected from the plurality of stopper bolts 25 to set the rotation amount of the arm 20 to the predetermined amount, the position of rotation of the arm 20 can be detected stably and reliably by selecting the holding member corresponding to the desired stopper bolt 25 from the plurality of holding members 130*a* to 130*h* and install the selected holding member to the end 126 of the bent member 124.

As described above, the clamp apparatus 10 according to the embodiment of the present invention is provided with the top cover 200 for covering the release projections 67*a*, 67*b*. The top cover 200 is made of a metal material, for example, stainless steel. Preferably, the outer surface of the top cover 200 is coated with a member 201 such as polytetrafluoroethylene, which is excellent in smoothness (in other words, slipperiness or anti-adhesion), for preventing spatters or the like from adhering.

As clearly understood from FIGS. 1 and 17 to 20, the top cover 200 comprises first and second plate members 202, 204 which are deformed rectangular, a third plate member 206 which has a curved corner and which bridges the first plate member 202 and the second plate member 204 that are disposed in parallel to one another, and a fourth plate member 208 which extends from a portion at which the third plate member 206 is terminated. Projections 209, 211 directed inwardly are formed on the first plate member 202 and the second plate member 204. One end of the fourth plate member 208 slightly protrudes from the end portions of the first plate member 202 and the second plate member 204 to constitute a tongue 210. Certain corners of the first plate member 202 and the second plate member 204, which are disposed opposite to the tongue 210, are curved, and fastening holes 212, 214 protrude at the corners.

A first step section 216 and a second step section 218 are provided on the first casing 46 and the second casing 48 at the portions at which the release projections 67*a*, 67*b* protrude. An attachment member 220, which is substantially H-shaped as viewed in a plan view, is fastened by utilizing the first step section 216 and the second step section 218. That is, the attachment member 220 includes a fifth plate member 222 and a sixth plate member 224 which are disposed in parallel to one another, and a seventh plate member 226 which bridges the fifth plate member 222 and the sixth plate member 224. The seventh plate member 226 slightly protrudes upwardly from the upper end edges of the fifth plate member 222 and the sixth plate member 224. Further, ends of the fifth plate member 222 and the sixth plate member 224 are bent inwardly to form protruding tabs 228, 230. Holes 232, 234 are formed through the fifth plate member 222 and the sixth plate member 224 at positions disposed opposite to the protruding tabs 228, 230. Further, holes 236, 238, 240, 242 are formed through the seventh plate member 226 and the protruding tabs 228, 230. Further, elongated holes 244, 246, which extend in the lateral direction as shown in FIG. 1, are formed through the fifth plate member 222 and the sixth plate member 224 on the side of the protruding tabs 228, 230. The release projections 67*a*, 67*b* extend upwardly through the space defined by the seventh plate member 226 and the protruding tabs 228, 230 of the attachment member 220.

In FIG. 1, reference numerals 248*a* to 248*d* indicate screw holes for fixing the attachment member 220 to the first step section 216 and the second step section 218 by inserting bolts 250*a* to 250*d* through the holes 236, 238, 240, 242. Reference numerals 252, 254 indicate holes for rotatably retaining the top cover 200, with screws 235*a*, 235*b*, via the holes 232, 234 and the fastening holes 212, 214 of the top cover 200.

Figure 20:
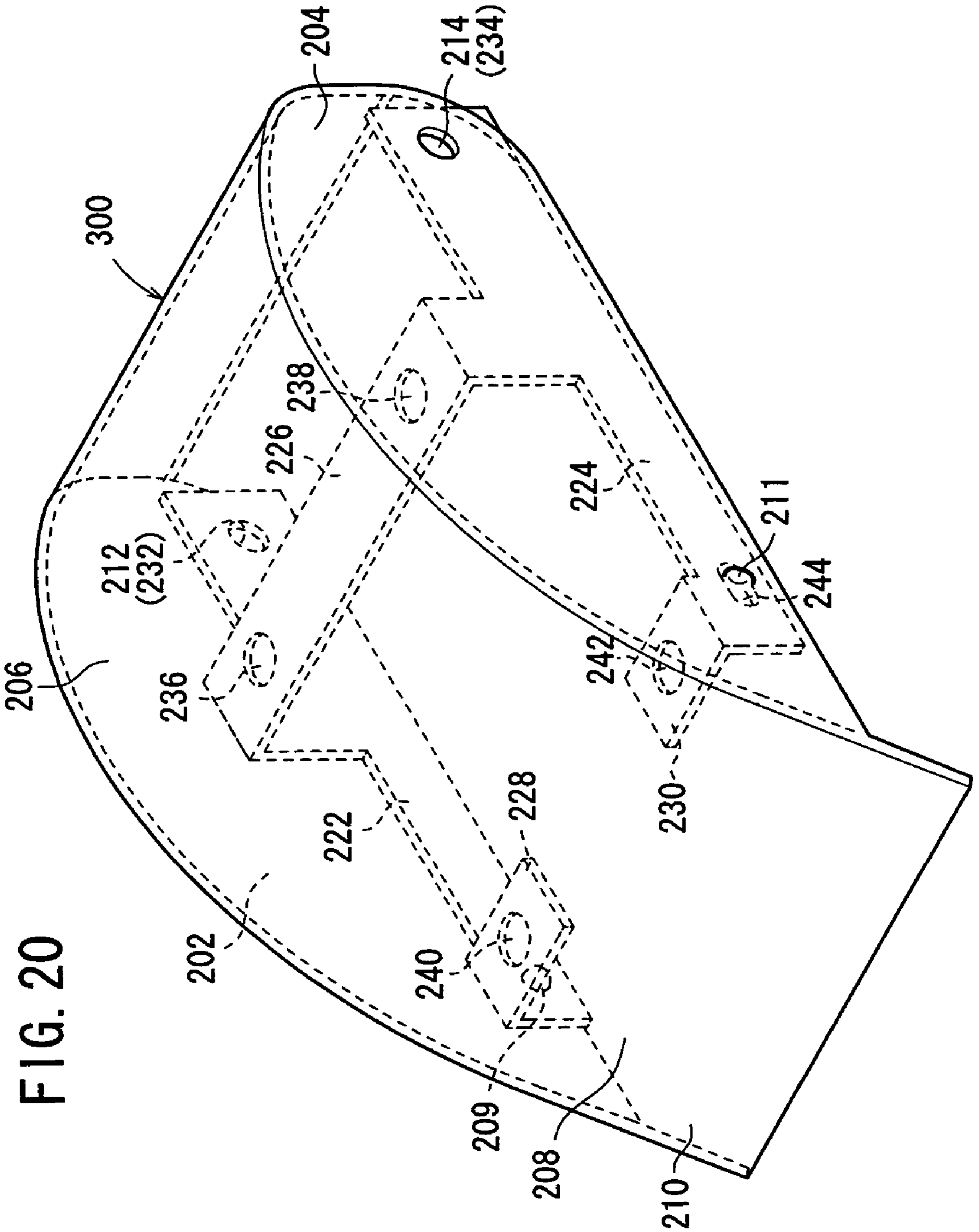
FIG. 20 is a perspective view illustrating a top cover of the clamp apparatus according to another embodiment of the present invention.

It is more preferable to use a top cover 300 shown in FIG. 20 in place of the top cover 200 described above.

In the embodiment described above, the curved and bent ridges are present on the third plate member 206 of the top cover 200. However, the top cover 300 of this embodiment has a third plate member 302 which is curved gently as a whole. Thus, even when spatters contact the top cover 300, the spatters may slide on the top cover 300 and fall off easily therefrom.

The clamp apparatus 10 according to the embodiment of the present invention is basically constructed as described above. Next, its operation, function, and effect will be explained.

Figure 11:
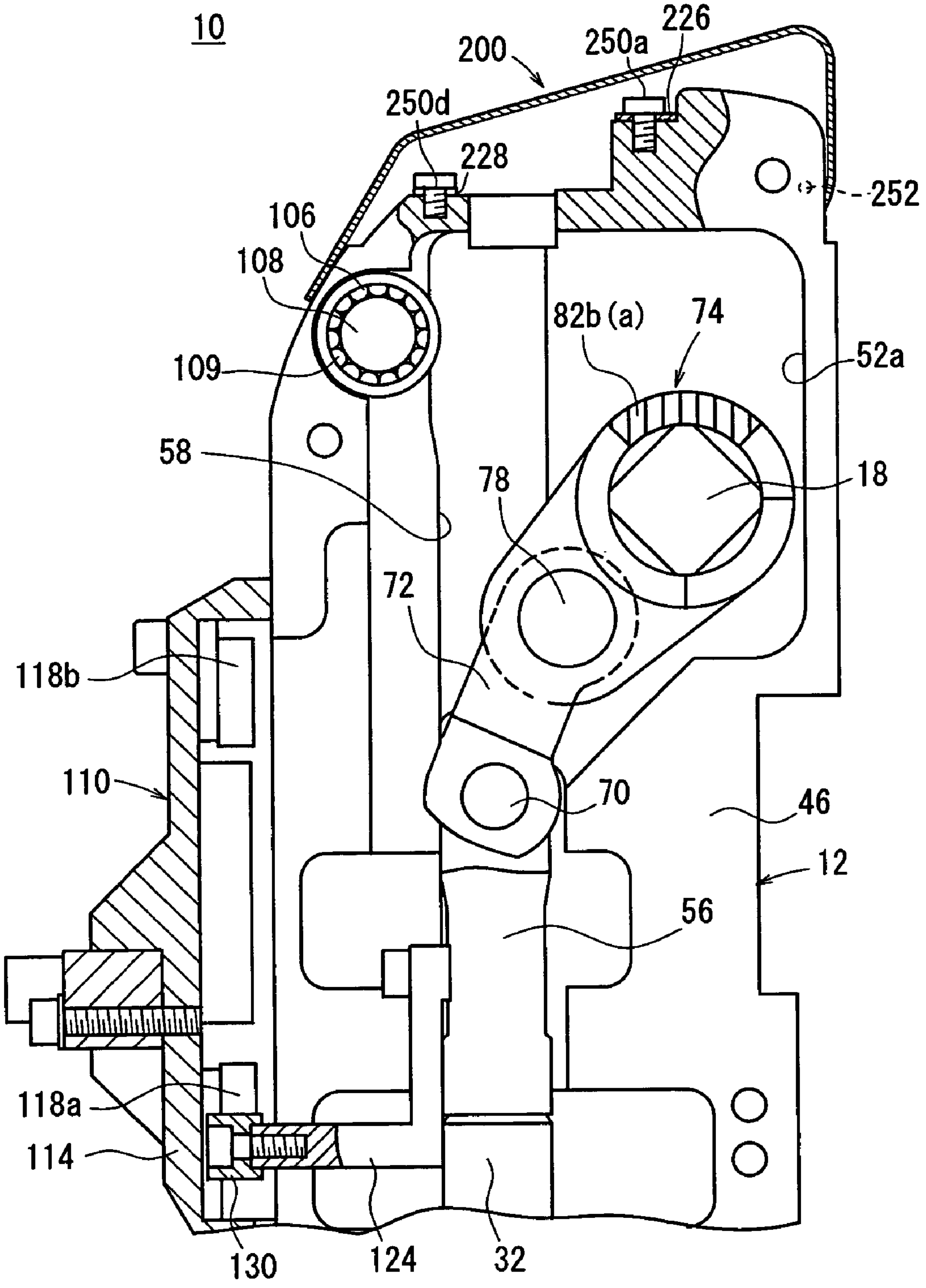
FIG. 11 shows, in vertical cross section, that an arm is located at an initial position.

At first, the clamp apparatus 10 is fixed to a predetermined position by using an unillustrated fixing means. First ends of unillustrated tube members are connected to the pair of pressure fluid inlet/outlet ports 42*a*, 44*a* (42*b*, 44*b*), respectively, and second ends of the tube members are connected to an unillustrated pressure fluid supply source. FIG. 11 shows the clamp apparatus 10 in the unclamped state, and FIG. 14 shows the clamp apparatus 10 in the clamped state. The following description will be made assuming that the unclamped state shown in FIG. 11 is the initial position.

After preparatory operation as described above, in the initial position shown in FIG. 11, the unillustrated pressure fluid supply source is energized to supply the pressure fluid into the cylinder chamber 28 via the pressure fluid inlet/outlet port 44*a*. The piston 30 is pressed by the pressure fluid in the cylinder chamber 28, and the piston 30 is moved upwardly along the cylinder chamber 28. During the movement, the guide grooves 58 guide the knuckle block 56 for sliding. Accordingly, the linear accuracy is retained for the piston 30, the piston rod 32, and the knuckle block 56.

The rectilinear motion of the piston 30 is transmitted to the toggle link mechanism 64 via the piston rod 32 and the knuckle joint 62. The rectilinear motion is converted into the rotary motion of the arm 20 when the support lever 74 of the toggle link mechanism 64 is rotated.

That is, the rectilinear motion (upward movement) of the piston 30 produces some force to upwardly press the link plate 72 and the knuckle joint 62 engaged with the free end of the piston rod 32. The pressing force exerted on the link plate 72 rotates the link plate 72 by a predetermined angle about the support point of the knuckle pin 70. Further, the support lever 74 is rotated since the link plate 72 is linked with the lever 74.

Figure 12:
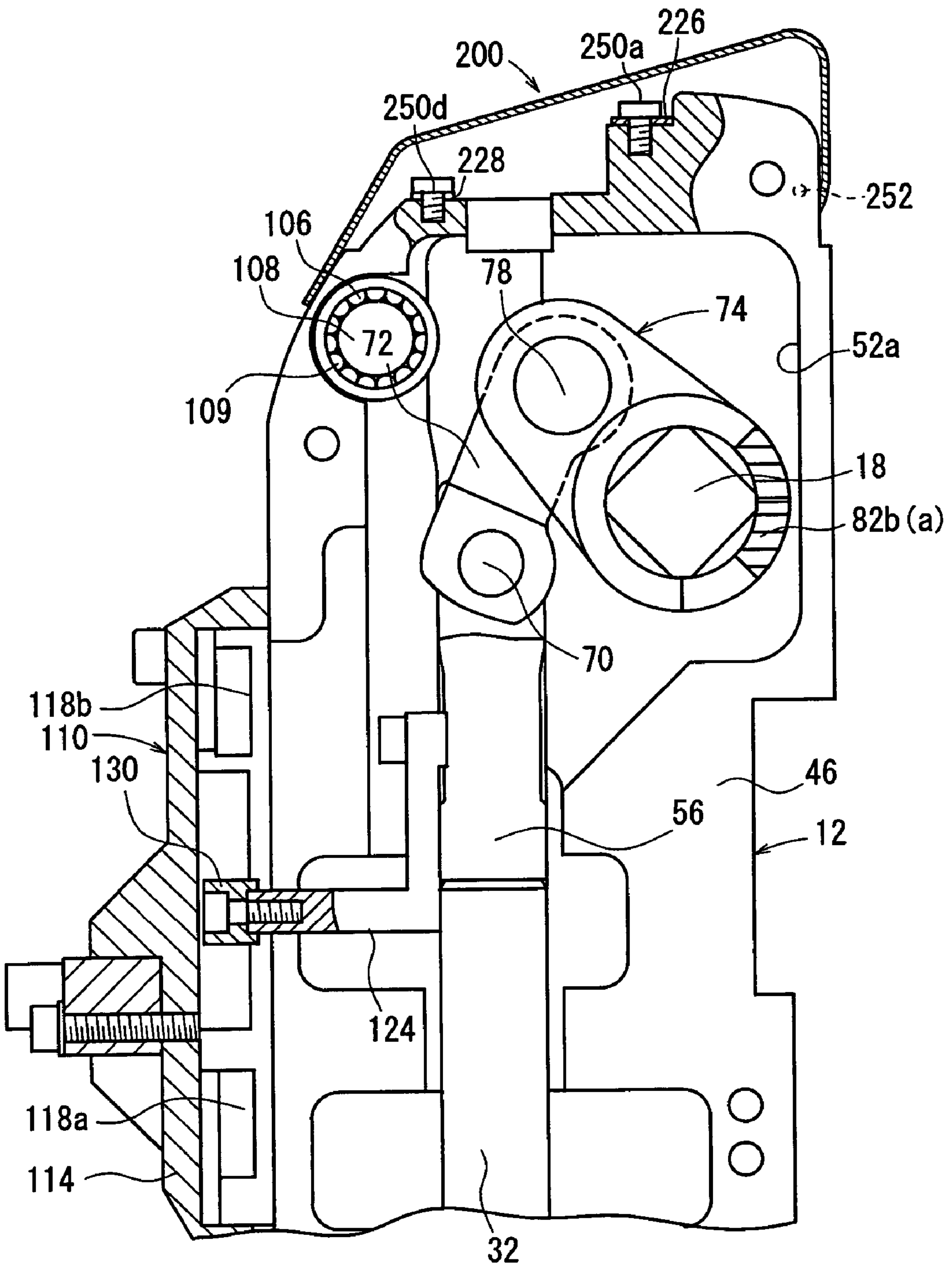
FIG. 12 shows, in vertical cross section, that the arm is rotated by a predetermined angle from the initial position shown in FIG. 11.

Therefore, the arm 20 is rotated by a predetermined angle about the support point of the bearing section 18 of the support lever 74. Accordingly, the circular arc-shaped projection 82*b* (82*a*) is rotated by a predetermined angle together with the support lever 74 (see FIG. 12).

During the rotation of the arm 20 as described above, the curved surface 104 of the link plate 72 contacts the guide roller 106. The guide roller 106 is rotated about the center of the pin member 108 while keeping the guide roller 106*in* contact with the curved surface 104.

Figure 13:
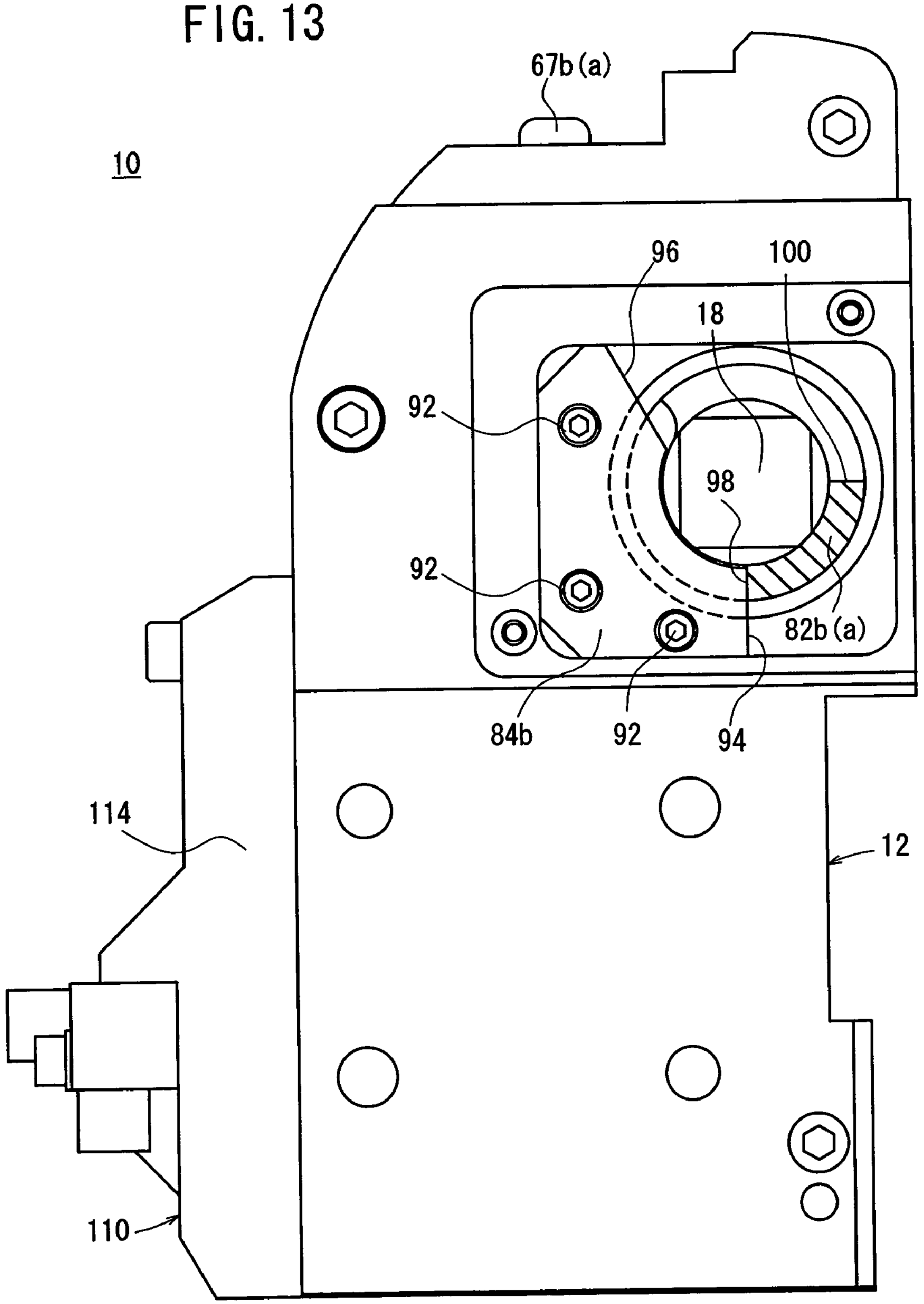
FIG. 13 shows, with partial cutaway, that the arm is rotated to a clamped state.

The arm 20 is further rotated, and the end surface 98 of the circular arc-shaped projection 82*b* (82*a*) contacts the first surface 94 of the plate 84*b* (84*a*) fixed on the body 12 as shown in FIG. 13. Accordingly, the rotary action of the arm 20 is stopped. As a result, the clamped state is achieved, in which the workpiece is clamped by the arm 20.

After the arm 20 stops the rotary action in the clamped state (see FIG. 3), the piston 30 and the piston rod 32 are further moved slightly upwardly, and the piston 30 contacts the inner wall surface of the body 12. Accordingly, the piston 30 and the piston rod 32 are stopped at the end position of displacement (see FIG. 14).

In this situation, the pair of release projections 67*a*, 67*b* formed integrally with the knuckle block 56 protrude by a predetermined length from the space defined by the protruding tabs 228, 230 and the seventh plate member 226 of the attachment member 220 installed to the upper portion of the body 12. Therefore, the operator can release the apparatus 10 from the clamped state and restore to the unclamped state, by lifting the tongue 210 of the top cover 200 upwardly to expose the release projections 67*a*, 67*b* and hammering the release projections 67*a*, 67*b*, for example, with an unillustrated plastic hammer to displace the release projections 67*a* (67*b*) downwardly.

When the workpiece is clamped, the reaction force generated corresponding to the clamping force is transmitted to the link pin 78 via the arm 20, and the reaction force is further transmitted to the guide roller 106 which contacts the curved surface 104 of the link plate 72. In this situation, the guide roller 106 is rotatably supported by the pin member 108 fixed in the hole in the body 12, and the reaction force transmitted to the guide roller 106 is applied to the pin member 108 fixed in the body 12.

Therefore, in the clamp apparatus 10, force corresponding to the reaction force is not applied to the knuckle pin 70 at all. Accordingly, it is possible to decrease the diameter of the knuckle pin 70, and it is possible to-improve the durability of the connecting portion between the knuckle block 56 and the link plate 72.

On the other hand, in FIG. 14, when the pressure fluid is supplied to the pressure fluid inlet/outlet port 42*a* by switching an unillustrated directional control valve, the piston 30 is moved downwardly. Further, the support lever 74 is rotated in a direction opposite to the above by the link plate 72 when the piston rod 32 is moved downwardly, and thus the arm 20 is rotated in a direction to separate from the workpiece.

During the rotation of the arm 20 in the direction to separate from the workpiece, the piston 30 contacts the damper member 26 on the stopper bolt 25 fixed to the bottom surface of the body 12, and thus the arm 20 stops the rotary action. As a result, the clamp apparatus 10 is restored to the initial position shown in FIG. 11.

When the pair of proximity switches 118*a*, 118*b* provided in the detecting section 110 detect the holding member 130 of the metal detection object which is displaceable together with the knuckle block 56, the initial position in the unclamped state of the arm 20 and the clamped state of the arm 20 after the rotation by the predetermined angle are detected.

When the stopper bolt 25 is replaced with one of other stopper bolts 25 having the different lengths, it is necessary that the switch holder 114 is detached and one of the holding members 130*b* to 130*h* having the lengths (2) to (8) corresponding to the selected other stopper bolt 25 is connected to one end 126 of the bent member 124. When one of the connected holding member 130*b* to 130*h* is detected by the pair of proximity switches 118*a*, 118*b*, it is found that the position of the arm 20 is in the clamped state or the unclamped state.

In the clamp apparatus 10 according to the embodiments of the present invention, the circular arc-shaped projections 82*a*, 82*b* as the stoppers are exposed through the substantially circular openings 16*a*, 16*b* formed through the body 12. In other words, the stoppers for stopping the rotary action of the arm 20 are provided outside of the body 12.

Therefore, as shown in FIG. 4, the support lever 74 on which the circular arc-shaped projections 82*a*, 82*b* as the stoppers are provided can be easily replaced by detaching the second casing 48 from the first casing 46 of the body 12.

In the clamp apparatus 10 described above, the plates 84*a*, 84*b*, which contact the circular arc-shaped projections 82*a*, 82*b*, are detachably installed to the first casing 46 and the second casing 48 by the screw members 92. Therefore, the maintenance operation can be performed easily and efficiently by detaching the cover members 88*a*, 88*b* installed to the body 12 and replacing with other new plates 84*a*, 84*b* without disassembling the first casing 46 and the second casing 48 of the body 12.

The range of the rotary action of the arm 20 can be easily changed by exchanging the stopper bolt 25 with various other stopper bolts 25 having the different lengths in the axial direction (see FIG. 2) to arbitrarily establish the lower limit of the piston 30. When the range of the rotary action of the arm 20 is changed, the position in rotation of the arm 20 can be reliably detected by connecting any one of the holding members 130*a* to 130*h* having the lengths (1) to (8) corresponding to the selected stopper bolt 25 to one end 126 of the bent member 124.

When the piston 30 contacts the inner wall surface of the body 12 to arrive at the end position of displacement (upper limit position), then the predetermined clearance T is formed between the step 73 of the knuckle block 56 and the inner wall surface of the body 12 as shown in FIG. 14, and the knuckle block 56 does not contact the inner wall surface of the body 12. Therefore, no load is transmitted to the cylinder section 14.

Figure 17:
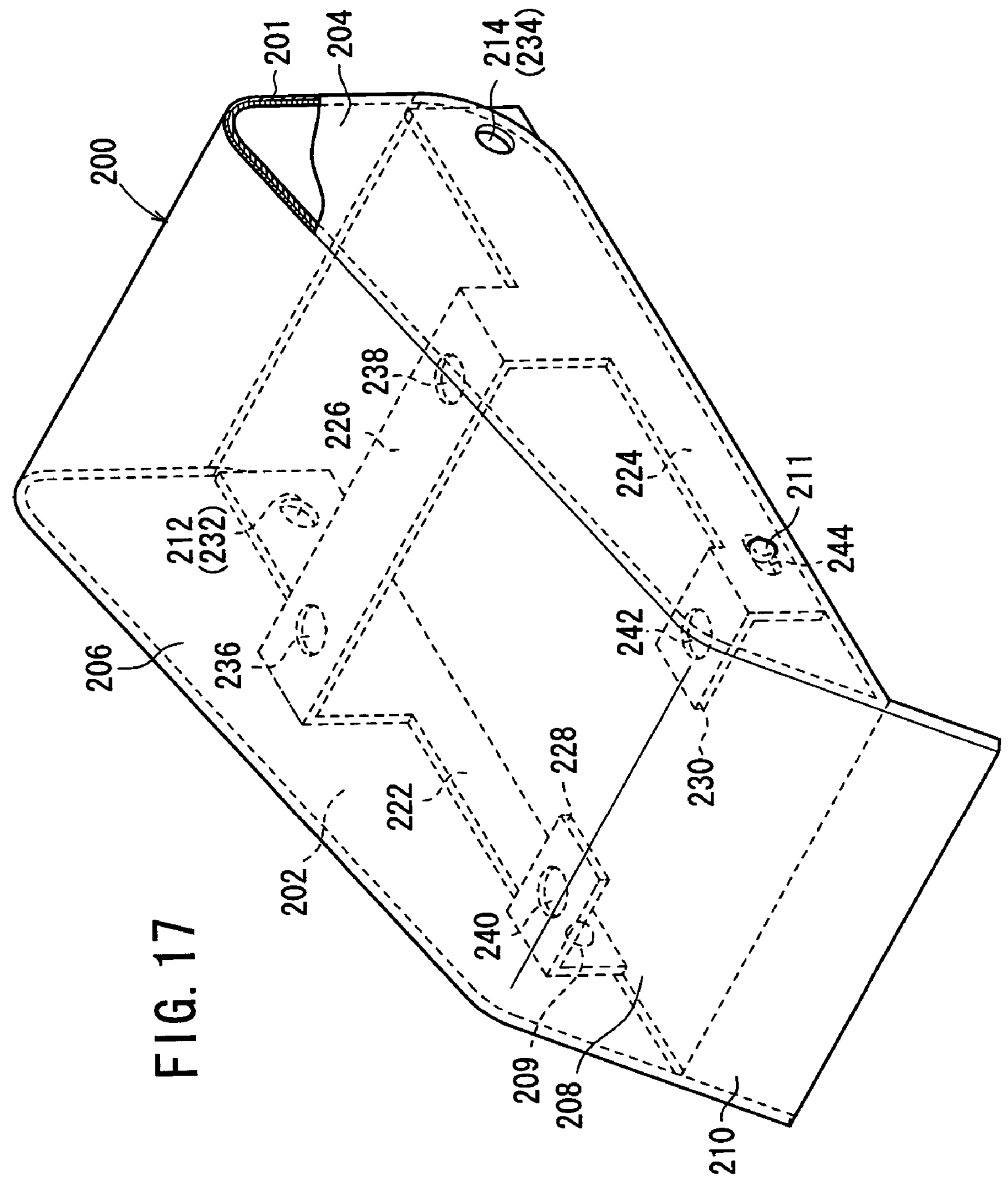
FIG. 17 is, with partial cutaway, a top cover of the clamp apparatus according to the embodiment of the present invention.
Figure 18:
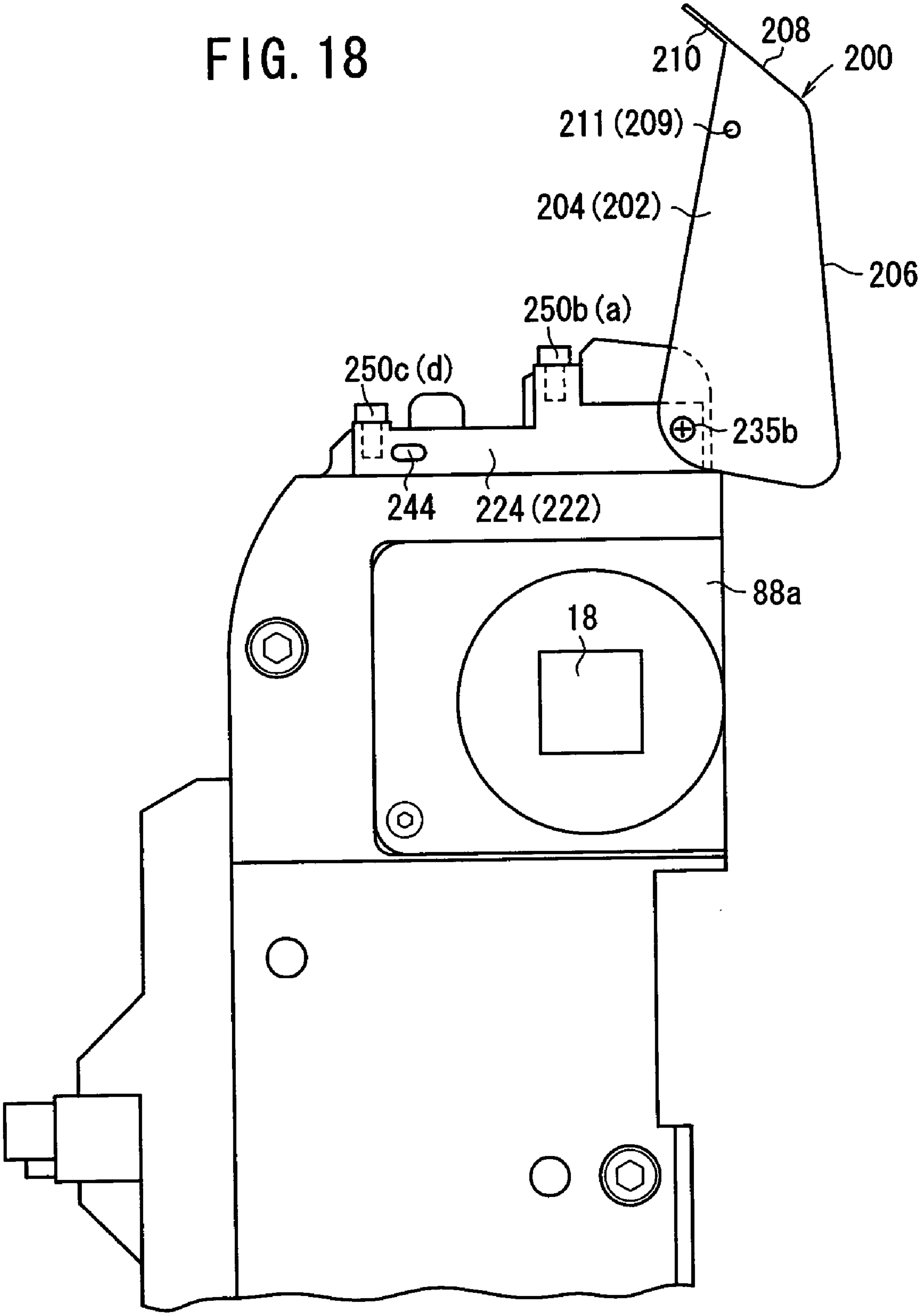
FIG. 18 is a partial side view showing that the top cover illustrated in FIG. 17 is open.
Figure 19:
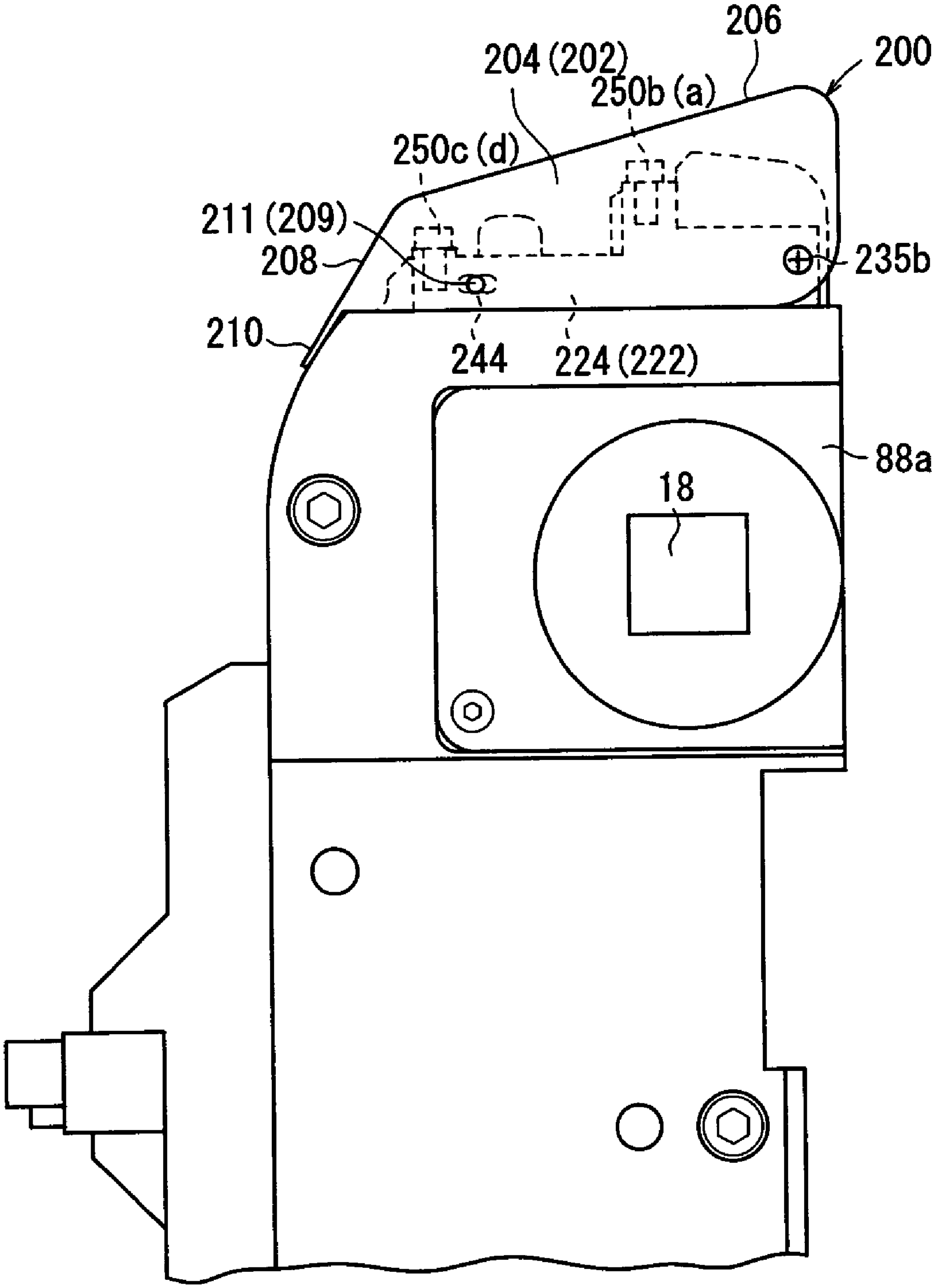
FIG. 19 is a partial side view showing that the top cover illustrated in FIG. 17 is closed.

According to the embodiment of the present invention, the release projections 67*a*, 67*b* are covered with the top cover 200 made of metal, preferably with the top cover coated with the member 201 which is excellent in smoothness (see FIG. 17). Therefore, the top cover is prevented from any adhesion of spatters during the arc welding. Even when the spatters are adhered, they can be removed easily. When the arm 20 is unlocked by using the release projections 67*a*, 67*b*, the tongue 210 of the top cover 200 may be lifted upwardly to open the top cover 200. Accordingly, when the top cover 200 is rotated about the center of the holes 252, 254, the release projections 67*a*, 67*b* are exposed. When the release projections 67*a*, 67*b* are moved downwardly by using, for example, the unillustrated plastic hammer, the arm 20 is readily unlocked.

When the top cover 200 is closed, the tongue 210 may be pushed and moved downwardly. During this operation, the projections 209, 211 are engaged with the elongated holes 244, 246 respectively, and the top cover 200 is installed in a simple locked state.

It will be clearly understood that even when the positions of the projections 209, 211 are slightly deviated, the simple locked state is achieved because the elongated holes 244, 246 are used as described above.

According to the present invention, the clamp apparatus is provided with the cover to cover the release projections of the clamp arm. Accordingly, it is sufficient to merely open the top cover which covers the release projections when the arm is going to be unlocked. It is not necessary to detach the top cover and/or attach the top cover again after releasing. Further, the spatters are hardly adhered, because the cover is made of the metal member. Even when the spatters are adhered, they can be removed easily. In particular, when the shape of the top cover is circular arc-shaped, or when the top cover is coated with a coating such as polytetrafluoroethylene which is excellent in smoothness, then it is possible to further avoid the adhesion of the spatters.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A clamp apparatus for converting rectilinear motion of a cylinder into rotary motion by means of a toggle link mechanism to clamp a workpiece by using an arm, said clamp apparatus comprising a cover member which is provided openably/closably on a main cylinder body so that a release means for unclamping said arm is covered therewith, wherein said cover member is pivotably and rotatably attached permanently to said main cylinder body.

2. The clamp apparatus according to claim 1, wherein said release means includes a knuckle joint directly connected to said arm, and said knuckle joint has a release projection covered with said cover member.

3. The clamp apparatus according to claim 2, wherein said release projection is bifurcated and has two branches, and said cover member covers projections of said two branches.

4. The clamp apparatus according to claim 1, wherein said cover member includes a pair of first and second plate members which extend in parallel to one another along an axis of said main cylinder body of said cylinder, and a third plate member which bridges said first and second plate members, and said first and second plate members are pivotably and rotatably attached to said main cylinder body.

5. The clamp apparatus according to claim 1, wherein said cover member has a lock mechanism for locking said cover member in a closed position on said main cylinder body of said cylinder.

6. The clamp apparatus according to claim 4 wherein said cover member has a tongue which is formed integrally with said third plate member, and said cover member is openable/closable by said tongue.

7. The clamp apparatus according to claim 1, wherein said main cylinder body of said cylinder has, at one end thereof, a first step and a second step which have different heights, and a release projection of said release means protrudes from said first step section while being covered with said cover member.

8. The clamp apparatus according to claim 7, wherein said cover member is pivotably attached to said second step section.

9. The clamp apparatus according to claim 7, wherein an attachment member is provided on said first step and/or said second step, and said attachment member is provided with a lock mechanism for engaging with said cover member.

10. The clamp apparatus according to claim 9, wherein said lock mechanism includes an elongated hole for engaging with a projection formed on said cover member.

11. The clamp apparatus according to claim 1, wherein said cover member has at least a curved portion.

12. The clamp apparatus according to claim 4, wherein said third plate member has a curved shape.

13. The clamp apparatus according to claim 1, wherein said cover member is made of a metal member.

14. The clamp apparatus according to claim 13, wherein an outer surface of said cover member is coated with a member that is excellent in smoothness.

15. The clamp apparatus according to claim 14, wherein said member excellent in smoothness comprises polytetrafluoroethylene.

16. A clamp apparatus for converting rectilinear motion of a cylinder into rotary motion by means of a toggle link mechanism to clamp a workpiece by using an arm, said clamp apparatus comprising a cover member which is provided openably/closably on a main cylinder body so that a release means for unclamping said arm is covered therewith, wherein said cover member includes a pair of first and second plate members which extend in parallel to one another along an axis of said main cylinder body of said cylinder, and a third plate member which bridges said first and second plate members, and said first and second plate members are pivotably and rotatably attached to said main cylinder body.

17. The clamp apparatus according to claim 16, wherein said release means includes a knuckle joint directly connected to said arm, and said knuckle joint has a release projection covered with said cover member.

18. The clamp apparatus according to claim 17, wherein said release projection is bifurcated and has two branches, and said cover member covers projections of said two branches.

19. The clamp apparatus according to claim 16, wherein said cover member has a lock mechanism for locking said cover member in a closed position on said main cylinder body of said cylinder.

20. The clamp apparatus according to claim 16, wherein said cover member has a tongue which is formed integrally with said third plate member, and said cover member is openable/closable by said tongue.

21. The clamp apparatus according to claim 16, wherein said main cylinder body of said cylinder has, at one end thereof, a first step and a second step which have different heights, and a release projection of said release means protrudes from said first step section while being covered with said cover member.

22. The clamp apparatus according to claim 21, wherein said cover member is pivotably attached to said second step section.

23. The clamp apparatus according to claim 21, wherein an attachment member is provided on said first step and/or said second step, and said attachment member is provided with a lock mechanism for engaging with said cover member.

24. The clamp apparatus according to claim 23, wherein said lock mechanism includes an elongated hole for engaging with a projection formed on said cover member.

25. The clamp apparatus according to claim 16, wherein said cover member has at least a curved portion.

26. The clamp apparatus according to claim 16, wherein said third plate member has a curved shape.

27. The clamp apparatus according to claim 16, wherein said cover member is made of a metal member.

28. The clamp apparatus according to claim 27, wherein an outer surface of said cover member is coated with a member that is excellent in smoothness.

29. The clamp apparatus according to claim 28, wherein said member excellent in smoothness comprises polytetrafluoroethylene.

* * * * *